United States Patent
Okubo et al.

(10) Patent No.: US 9,043,541 B2
(45) Date of Patent: May 26, 2015

(54) STORAGE CONTROL DEVICE, STORAGE DEVICE, AND CONTROL METHOD FOR CONTROLLING STORAGE CONTROL DEVICE

(71) Applicant: Sony Corporation, Tokyo (JP)

(72) Inventors: Hideaki Okubo, Saitama (JP); Keiichi Tsutsui, Kanagawa (JP); Kenichi Nakanishi, Tokyo (JP); Naohiro Adachi, Kanagawa (JP)

(73) Assignee: Sony Corporation, Tokyo (JP)

( * ) Notice: Subject to any disclaimer, the term of this patent is extended or adjusted under 35 U.S.C. 154(b) by 281 days.

(21) Appl. No.: 13/713,353

(22) Filed: Dec. 13, 2012

(65) Prior Publication Data

US 2013/0179646 A1 Jul. 11, 2013

(30) Foreign Application Priority Data

Jan. 10, 2012 (JP) ................................ 2012-001781

(51) Int. Cl.
*G06F 3/06* (2006.01)
*G06F 12/02* (2006.01)
*G11C 16/10* (2006.01)
*G06F 12/00* (2006.01)

(52) U.S. Cl.
CPC ............ *G06F 12/00* (2013.01); *G06F 12/0238* (2013.01); *G06F 2212/7202* (2013.01); *G06F 2212/7208* (2013.01)

(58) Field of Classification Search
None
See application file for complete search history.

(56) References Cited

U.S. PATENT DOCUMENTS

| 5,179,687 | A  | * | 1/1993  | Hidaka et al. ................. | 711/118 |
|-----------|----|---|---------|-------------------------------|---------|
| 2005/0015567 | A1 | * | 1/2005  | Zohar et al. ................... | 711/118 |
| 2006/0059279 | A1 | * | 3/2006  | Kakizaki ......................... | 710/33  |
| 2006/0248259 | A1 | * | 11/2006 | Ryu et al. ......................... | 711/1   |
| 2007/0268745 | A1 | * | 11/2007 | Lasser ..................... | 365/185.01 |
| 2009/0138652 | A1 | * | 5/2009  | Kim et al. ..................... | 711/103 |
| 2009/0161155 | A1 | * | 6/2009  | Baba et al. ................... | 358/1.15 |
| 2012/0005439 | A1 | * | 1/2012  | Ukai ............................. | 711/158 |
| 2012/0198152 | A1 | * | 8/2012  | Terry et al. .................... | 711/114 |

FOREIGN PATENT DOCUMENTS

JP 2009-205335 9/2009

* cited by examiner

*Primary Examiner* — Matthew Bradley
*Assistant Examiner* — Daniel Bernard
(74) *Attorney, Agent, or Firm* — Fishman Stewart Yamaguchi PLLC

(57) ABSTRACT

A storage control device is disclosed including a write block and a read block. The write block establishes a high-speed access data count. If a plurality of data are to be written to high- and low-speed access storage blocks, the write block writes as many data as the high-speed access data count from among the plurality of data to the high-speed access storage block as high-speed access data while writing the remaining data to the low-speed access storage block as low-speed access data. If the plurality of data written to the low- and high-speed access storage blocks are to be read, the read block issues a request to the high-speed access storage block to read the high-speed access data and a request to the low-speed access storage block to start reading the low-speed access data after the high-speed access data have been read.

8 Claims, 22 Drawing Sheets

| LOGICAL ADDRESS | SECTOR MANAGEMENT INFORMATION ||||||
|---|---|---|---|---|---|---|
| | FLASH MEMORY PHYSICAL ADDRESS | PHYSICAL ADDRESS OFFSET | ENABLE FLAG | NVRAM FLAG | NVRAM SECTOR NUMBER | NVRAM CONTINUOUS SECTOR COUNT |
| 0x000000000 | $fA_0$ | $X_0$ | T | F | - | - |
| 0x000000001 | - | - | F | F | - | - |
| ⋮ | ⋮ | ⋮ | ⋮ | ⋮ | ⋮ | ⋮ |
| i | - | - | T | T | 0 | 3 |
| i+1 | - | - | T | T | 1 | 3 |
| i+2 | - | - | T | T | 2 | 3 |
| i+3 | $fA_{i+3}$ | $X_{i+3}$ | T | F | - | - |
| ⋮ | ⋮ | ⋮ | ⋮ | ⋮ | ⋮ | ⋮ |
| n | $fA_n$ | $X_n$ | T | F | - | - |

FIG.8

| LOGICAL ADDRESS | LOGICAL ADDRESS OFFSET | NVRAM PAGE MANAGEMENT INFORMATION | | |
|---|---|---|---|---|
| | | NVRAM PHYSICAL ADDRESS | PHYSICAL PAGE NUMBER | CONTINUOUS PHYSICAL PAGE COUNT |
| ⋮ | ⋮ | ⋮ | ⋮ | ⋮ |
| i | 0 | $rA_i$ | 0 | 6 |
| i | 1 | $rA_{i+1}$ | 1 | 6 |
| i+1 | 0 | $rA_{i+2}$ | 2 | 6 |
| i+1 | 1 | $rA_{i+3}$ | 3 | 6 |
| i+2 | 0 | $rA_{i+4}$ | 4 | 6 |
| i+2 | 1 | $rA_{i+5}$ | 5 | 6 |
| ⋮ | ⋮ | ⋮ | ⋮ | ⋮ |

| FLASH MEMORY PHYSICAL ADDRESS | STATUS |
|---|---|
| 0x000000000 | IN USE |
| ⋮ | ⋮ |
| h | IN USE |
| h+1 | FREE |
| h+2 | DEFECTIVE |
| ⋮ | ⋮ |

| NVRAM PHYSICAL ADDRESS | STATUS |
|---|---|
| 0x000000000 | IN USE |
| ⋮ | ⋮ |
| k | IN USE |
| k+1 | FREE |
| k+2 | DEFECTIVE |
| ⋮ | ⋮ |

FIG.19    330

| LOGICAL ADDRESS | SECTOR MANAGEMENT INFORMATION | | | | | |
|---|---|---|---|---|---|---|
| | FLASH MEMORY PHYSICAL ADDRESS | PHYSICAL ADDRESS OFFSET | ENABLE FLAG | NVRAM FLAG | NVRAM SECTOR NUMBER | NVRAM CONTINUOUS SECTOR COUNT |
| 0x000000000 | $fA_0$ | $X_0$ | T | F | - | - |
| 0x000000001 | - | - | F | F | - | - |
| ⋮ | ⋮ | ⋮ | ⋮ | ⋮ | ⋮ | ⋮ |
| j | - | - | F | F | - | - |
| j+1 | - | - | F | F | - | - |
| j+2 | - | - | F | F | - | - |
| j+3 | $fA_{i+3}$ | $X_{i+3}$ | T | F | - | - |
| j+4 | - | - | F | F | - | - |
| j+5 | $fA_{j+5}$ | $X_{j+5}$ | T | F | - | - |
| j+6 | - | - | F | F | - | - |
| j+7 | $fA_{j+7}$ | $X_{j+7}$ | T | F | - | - |
| ⋮ | ⋮ | ⋮ | ⋮ | ⋮ | ⋮ | ⋮ |
| n | $fA_n$ | $X_n$ | T | F | - | - |

FIG.20   330

| LOGICAL ADDRESS | SECTOR MANAGEMENT INFORMATION ||||||
|---|---|---|---|---|---|---|
| | FLASH MEMORY PHYSICAL ADDRESS | PHYSICAL ADDRESS OFFSET | ENABLE FLAG | NVRAM FLAG | NVRAM SECTOR NUMBER | NVRAM CONTINUOUS SECTOR COUNT |
| 0x000000000 | $fA_0$ | $X_0$ | T | F | - | - |
| 0x000000001 | - | - | F | F | - | - |
| ⋮ | ⋮ | ⋮ | ⋮ | ⋮ | ⋮ | ⋮ |
| j | $fA_j$ | 0 | T | F | - | - |
| j+1 | $fA_j$ | 1 | T | F | - | - |
| j+2 | $fA_j$ | 2 | T | F | - | - |
| j+3 | $fA_j$ | 3 | T | F | - | - |
| j+4 | $fA_j$ | 4 | T | F | - | - |
| j+5 | $fA_j$ | 5 | T | F | - | - |
| j+6 | $fA_j$ | 6 | T | F | - | - |
| j+7 | $fA_j$ | 7 | T | F | - | - |
| ⋮ | ⋮ | ⋮ | ⋮ | ⋮ | ⋮ | ⋮ |
| n | $fA_n$ | $X_n$ | T | F | - | - |

| LOGICAL ADDRESS | SECTOR MANAGEMENT INFORMATION | | | | | |
|---|---|---|---|---|---|---|
| | FLASH MEMORY PHYSICAL ADDRESS | PHYSICAL ADDRESS OFFSET | ENABLE FLAG | NVRAM FLAG | NVRAM SECTOR NUMBER | NVRAM CONTINUOUS SECTOR COUNT |
| 0x000000000 | $fA_0$ | $X_0$ | T | F | - | - |
| 0x000000001 | - | - | F | F | - | - |
| ⋮ | ⋮ | ⋮ | ⋮ | ⋮ | ⋮ | ⋮ |
| i | - | - | F | F | - | - |
| i+1 | - | - | F | F | - | - |
| i+2 | - | - | F | F | - | - |
| ⋮ | ⋮ | ⋮ | ⋮ | ⋮ | ⋮ | ⋮ |
| n | $fA_n$ | $X_n$ | T | F | - | - |

| LOGICAL ADDRESS | SECTOR MANAGEMENT INFORMATION | | | | | |
|---|---|---|---|---|---|---|
| | FLASH MEMORY PHYSICAL ADDRESS | PHYSICAL ADDRESS OFFSET | ENABLE FLAG | NVRAM FLAG | NVRAM SECTOR NUMBER | NVRAM CONTINUOUS SECTOR COUNT |
| 0x000000000 | $fA_0$ | $X_0$ | T | F | - | - |
| 0x000000001 | - | - | F | F | - | - |
| ⋮ | ⋮ | ⋮ | ⋮ | ⋮ | ⋮ | ⋮ |
| i | - | - | F | T | 0 | 3 |
| i+1 | - | - | F | T | 1 | 3 |
| i+2 | - | - | F | T | 2 | 3 |
| ⋮ | ⋮ | ⋮ | ⋮ | ⋮ | ⋮ | ⋮ |
| n | $fA_n$ | $X_n$ | T | F | - | - |

FIG.23

| WRITE COMMAND | FIRST LOGICAL ADDRESS | DATA SIZE | NVRAM CONTINUOUS SECTOR COUNT | ... |
|---|---|---|---|---|

US 9,043,541 B2

STORAGE CONTROL DEVICE, STORAGE DEVICE, AND CONTROL METHOD FOR CONTROLLING STORAGE CONTROL DEVICE

BACKGROUND

The present disclosure relates to a storage control device. More particularly, the disclosure relates to a storage control device controlling two storage blocks having different access times, a storage device, and a control method for controlling the storage control device.

In the past, some storage devices combined two storage blocks with different access times to constitute a high-capacity storage device having a reduced access time (latency). For example, a flash memory was used as one storage block with a relatively short access time (low latency), and a hard disk drive (HDD) was adopted as the other storage block with a relatively long access time (high latency). In another example, an NVRAM (non-volatile random access memory) was used as the low-latency storage block and a flash memory as the high-latency storage block. Where the storage blocks with different access times were combined, the low-latency storage block generally had a smaller capacity than the high-latency storage block because the low-latency storage block generally cost higher than the high-latency storage block per unit capacity.

Where data is to be written to the above storage device combining the storage blocks with different access times, the storage device needs to determine which of the storage blocks the data of interest is to be written to. With regard to determining the destination to which to write data, methods have been proposed to write data with high access frequency preferentially to the low-latency storage block (e.g., see Japanese Patent Laid-Open No. 2009-205335). The proposed methods are intended to reduce the access time of the entire storage device in retrieving data with high access frequency therefrom.

SUMMARY

However, with the above related-art technique, it was sometimes difficult to boost the number of data read out (i.e., throughput) per unit time upon elapse of an access time. For example, if data items have been written to various locations in the storage device, there may have been too few data items written to the low-latency storage block. In this case, there may elapse a prolonged idle time from the time the reading of the data from the low-latency storage block is completed to the time data readout is started in the high-latency storage block. Throughput may then be reduced by as much as what corresponds to the idle time. And if there have been too many data items written to the low-latency storage block, that means the capacity of the low-latency storage block may have been used wastefully. As can be seen in these cases where the number of data items written to the low-latency storage block is not appropriate, there is a risk of the capacity of the low-latency storage block being used wastefully or of the throughput of the entire storage device not being improved sufficiently.

The present disclosure has been made in view of the above circumstances and provides a technique for boosting the throughput of an entire storage device while efficiently using the capacity of the storage device.

According to one embodiment of the present disclosure, there is provided a storage control device as well as a control method for use therewith. The storage control device includes: a write block configured such that given a low-speed access storage block having an access time longer than that of a high-speed access storage block, the access time being from the time a request to read data is issued to the time the data is read, the write block establishes as a high-speed access data count the number of data readable by the high-speed access storage block within a time period corresponding to the access time of the low-speed access storage block, the write block further writing, if a plurality of data are to be written to the high-speed and the low-speed access storage blocks, as many data as the high-speed access data count from among the plurality of data to the high-speed access storage block as high-speed access data while writing the remaining data to the low-speed access storage block as low-speed access data; and a read block configured such that if the plurality of data written to the low-speed and the high-speed access storage blocks are to be read therefrom, the read block issues a request to the high-speed access storage block to read the high-speed access data and a request to the low-speed access storage block to start reading the low-speed access data after the high-speed access data have been read out. According to the storage control device and the control method for use therewith outlined above, where a plurality of data are to be written, as many high-speed access data as the high-speed access data count are written to the high-speed access storage block and the remaining low-speed access data are written to the low-speed access storage block. Where a plurality of data are to be read, requests are issued to read the high-speed access data and low-speed access data from these blocks.

Preferably, the storage control device of this disclosure may further include a management information storage block configured to store management information for acquiring a low-speed access start address at which the low-speed access data to be read first have been written, from a high-speed access address at which the high-speed access data have been written. If the high-speed access data are to be read from the high-speed access address, the read block may issue a request to the high-speed access storage block to read the high-speed access data, the read block further acquiring the low-speed access start address based on the management information, the read block further issuing a request to the low-speed access storage block to read the low-speed access data from the low-speed access start address. This preferred structure allows the low-speed access start address to be acquired from the high-speed access address.

Preferably, the management information storage block above may store as the management information a relative positional relationship between each of the high-speed access addresses and the low-speed access start address. Upon reading the high-speed access data from any one of the high-speed access addresses, the read block may acquire the low-speed access start address from the high-speed access address in question and from the management information corresponding to the high-speed access address. This preferred structure allows the low-speed access start address to be acquired from the relative positional relationship between the high-speed access address and the low-speed access start address as well as from the high-speed access address.

Preferably, the read block above may issue simultaneously the request to the high-speed access storage block to read the high-speed access data and the request to the low-speed access storage block to read the low-speed access data. This preferred structure permits simultaneous issuance of the request to read the high-speed access data and the request to read the low-speed access data.

Preferably, if the high-speed access data count is designated with an instruction to write the plurality of data, the write block above may write the plurality of data upon establishing the designated high-speed access data count. This preferred structure allows the designated high-speed access data count to be established.

Preferably, if it is instructed with the instruction to write that the written data are to be later read at high speed, the write block above may write to the high-speed access storage block as many data as the high-speed access data count as the high-speed access data while writing the remaining data to the low-speed access storage block as the low-speed access data. According to this preferred structure, if it is instructed that data be written so as to be read later at high speed, the high-speed access data from among the data are written to the high-speed access storage block and the low-speed access data are written to the low-speed access storage block.

According to another embodiment of the present disclosure, there is provided a storage device including: a high-speed access storage block; a low-speed access storage block configured to have an access time longer than that of the high-speed access storage block, the access time being from the time a request to read data is issued to the time the data is read out; and a storage control device including: a write block configured to establish as a high-speed access data count the number of data readable by the high-speed access storage block within a time period corresponding to the access time of the low-speed access storage block, the write block further writing, if a plurality of data are to be written to the high-speed and the low-speed access storage blocks, as many data as the high-speed access data count from among the plurality of data to the high-speed access storage block as high-speed access data while writing the remaining data to the low-speed access storage block as low-speed access data; and a read block configured such that if the plurality of data written to the low-speed and the high-speed access storage blocks are to be read therefrom, the read block issues a request to the high-speed access storage block to read the high-speed access data and a request to the low-speed access storage block to start reading the low-speed access data after the high-speed access data have been read out. According to the storage device outlined above, where a plurality of data are to be written, as many high-speed access data as the high-speed access data count are written to the high-speed access storage block and the remaining low-speed access data are written to the low-speed access storage block. Where a plurality of data are to be read, the request to read the high-speed access data and the request to read the low-speed access data are issued to the storage blocks.

According to the disclosed technology offering the above-outlined advantageous effects, it is possible to make efficient use of the capacity of a storage device while boosting the throughput of the entire storage device.

BRIEF DESCRIPTION OF THE DRAWINGS

FIG. 7 is a tabular view showing a sector address translation table for use with the embodiment;

FIG. 8 is a tabular view showing a typical NVRAM page address translation table for use with the embodiment;

FIG. 9 is a tabular view showing a typical flash memory physical address management table for use with the embodiment;

FIG. 10 is a tabular view showing a typical NVRAM physical address management table for use with the embodiment;

FIG. 19 is a tabular view showing a typical sector address translation table in effect before writing of data to the flash memory as part of the embodiment;

FIG. 20 is a tabular view showing a typical sector address translation table in effect after writing of data to the flash memory as part of the embodiment;

FIG. 21 is a tabular view showing a typical sector address translation table in effect before writing of data to the NVRAM as part of the embodiment;

FIG. 22 is a tabular view showing a typical sector address translation table in effect after writing of data to the NVRAM as part of the embodiment; and FIG. 23 is a schematic view showing typical parameters to be set in a write command for use with a variation of the embodiment.

DETAILED DESCRIPTION OF THE PREFERRED EMBODIMENTS

Some preferred embodiments of the disclosed technology (simply called the embodiment hereunder) are described below. The description is given under the following headings:
1. First embodiment (an example in which a predetermined number of data are written to an NVRAM and the remaining data to a flash memory)
2. Variation <1. First Embodiment>
[Typical Configuration of the Information Processing System]

Figure 1:
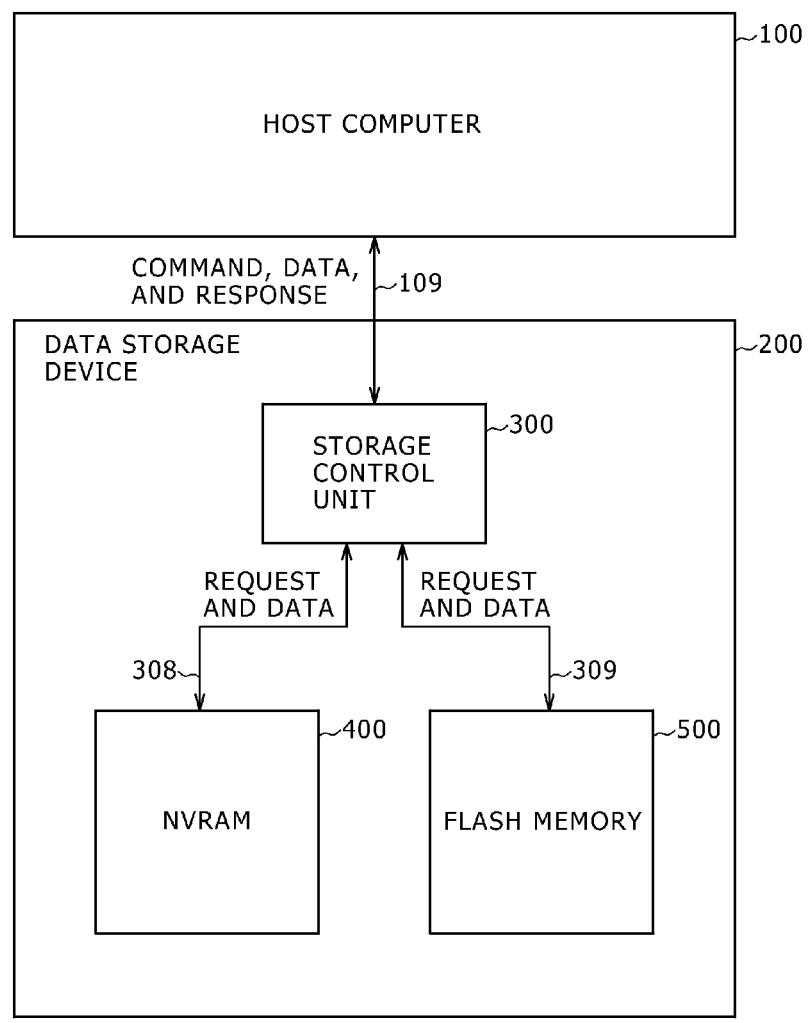
FIG. 1 is a block diagram showing a typical configuration of an information processing system of an embodiment of the present disclosure.

FIG. 1 is a block diagram showing a typical configuration of an information processing system of an embodiment of the present disclosure. This information processing system writes and reads data during information processing. The information processing system includes a host computer 100 and a data storage device 200.

In information processing, the host computer 100 writes data to the data storage device 200 and reads written data from the data storage device 200.

Upon writing data, the host computer 100 outputs a write command along with write data to the data storage device 20 via a signal line 109. The host computer 100 then receives from the data storage device 200 a response to the write command via the signal line 109. Upon reading data, the host computer 100 outputs a read command to the data storage device 200 via the signal line 109. The host computer 100 then receives a response to the read command as well as the read data from the data storage device 200 via the signal line 109. Here, it is assumed that the writing or reading of data to or from the data storage device 200 is performed in units of, say, 512 bytes. With the data storage device 200, the data in each access unit (512 bytes) will be referred to as a "sector" hereunder.

The data storage device 200 writes data and reads written data under control of the host computer 100. The data storage device 200 includes a storage control unit 300, and two storage blocks having different read access times. Here, the read access time is a time period from the time a request is issued to the storage block to read data to the time the data in question has been read therefrom. For example, the storage block with the shorter access time may be an NVRAM 400, and the storage block with the longer access time may be a flash memory 500.

The combination of the storage blocks is not limited to that of the NVRAM 400 and flash memory 500; some other storage blocks with different access times may be used instead in combination. For example, the data storage device 200 may adopt a flash memory as the storage block with the relatively short access time and a hard disk drive (HDD) as the storage block with the relatively long access time. It may be noted that the data storage device 200 is an example of the storage device described in the appended claims, that the NVRAM 400 is an example of the high-speed access storage block described in the appended claims, and that the flash memory 500 is an example of the low-speed access storage block described in the appended claims.

Under control of the host computer 100, the storage control unit 300 writes data to the NVRAM 400 and flash memory 500 or reads written data therefrom. Upon receipt of a write command instructing writing of data composed of a plurality of sectors, the storage control unit 300 outputs and writes a predetermined number (e.g., 3) of sectors of the data to the NVRAM 400 via a signal line 308. The storage control unit 300 writes the remaining sectors of the data to the flash memory 500 via the signal line 309. Upon receiving a read command, the storage control unit 300 simultaneously issues read requests to the NVRAM 400 and flash memory 500. The storage control unit 300 receives the read data from the NVRAM 400 and flash memory 500, and outputs the read data to the host computer 100.

Here, the number of sectors written to the NVRAM 400 will be called the "NVRAM continuous sector count" hereunder. The NVRAM continuous sector count is the number of sectors that can be read from the NVRAM 400 during a time period corresponding to the access time of the flash memory 500. The NVRAM continuous sector count may be obtained from the access time of the NVRAM 400, access time of the flash memory 500, and throughput of the NVRAM 400. The throughput represents the number of data (sectors) read per unit time upon elapse of the access time. Specific values of the access times and throughput will be discussed later along with a method for acquiring the NVRAM continuous sector count based on these values. It may be noted that the NVRAM continuous sector count is an example of the high-speed access data count described in the appended claims.

Data may be written to or read from the NVRAM 400 and flash memory 500 under control of the storage control unit 300. It is assumed here that except for an error correcting code (ECC), data are written to and read from the NVRAM 400 in units of 256 bytes. In the ensuing description, the data in one access unit (256 bytes) for the NVRAM 400 will be called an "NVRAM page." On the other hand, it is assumed that except for the error correcting code, data are written to and read from the flash memory 500 in units of eight sectors. In the ensuing description, the data in one access unit (512×8 bytes) for the flash memory 500 will be called a "flash memory page."

[Typical Structure of the Data Storage Device]

Figure 2:
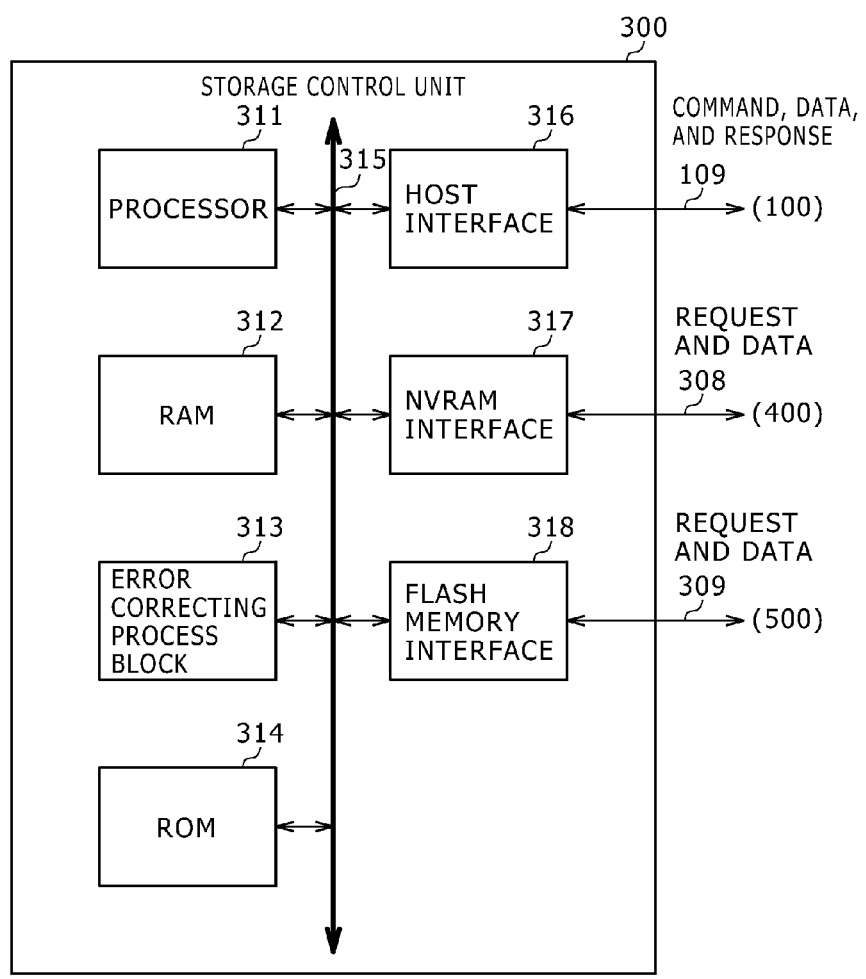
FIG. 2 is a block diagram showing a specific structure of a storage control unit as part of the embodiment.

FIG. 2 is a block diagram showing a specific structure of the storage control unit 300 as part of the embodiment. The storage control unit 300 includes a processor 311, a RAM 312, an error correcting process block 313, a ROM (read only memory) 314, and a bus 315. The storage control unit 300 further includes a host interface 316, an NVRAM interface 317, and a flash memory interface 318.

The processor 311 controls the storage control unit 300 as a whole. The RAM 312 temporarily stores the data needed by the processor 311 during its processing. The error correcting process block 313 adds an error correcting code to the data to be written and corrects error that may be found in the read data based on the error correcting code. The ROM 314 stores the programs to be executed by the processor 311.

The bus 315 provides a common path via which the processor 311, RAM 312, error correcting process block 313, ROM 314, host interface 316, NVRAM interface 317, and flash memory interface 318 exchange data therebetween.

The host interface 316 exchanges data and commands with the host computer 100. The NVRAM interface 317 exchanges data and requests with the NVRAM 400. The flash memory interface 318 exchanges data and requests with the flash memory 500.

Figure 3:
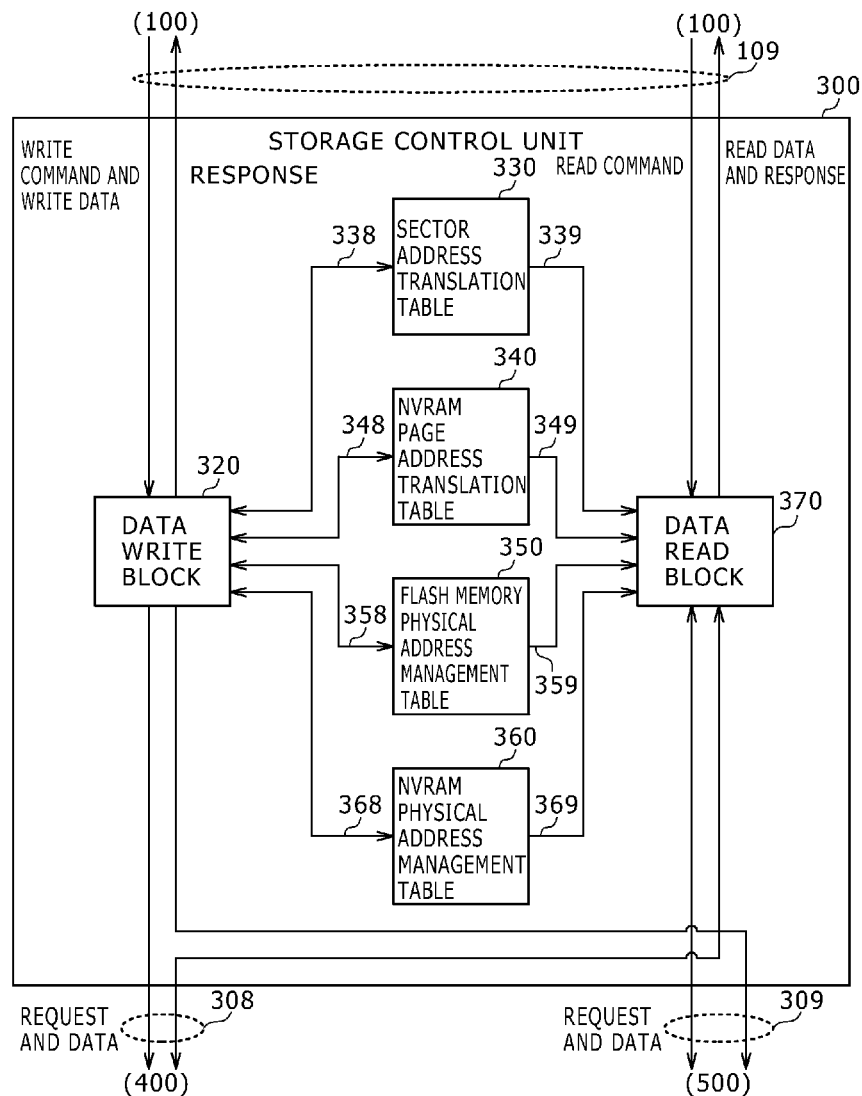
FIG. 3 is a block diagram showing a typical structure of the storage control unit as part of the embodiment.

FIG. 3 is a block diagram showing a typical structure of the storage control unit 300 as part of the embodiment. The storage control unit 300 includes a data write block 320 and a data read block 370. The storage control unit 300 further includes a sector address translation table 330, an NVRAM page address translation table 340, a flash memory physical address management table 350, and an NVRAM physical address management table 360. For example, the data write block 320 and data read block 370 may be implemented using the processor 311, RAM 312, error correcting process block 313, and ROM 314 shown in FIG. 2. The tables may be held in, say, the RAM 312 shown in FIG. 2.

The sector address translation table 330 associates logical addresses with the physical addresses in the flash memory 500. The logical addresses are each assigned to one sector in the data storage device 200. The physical addresses are each assigned to one sector in the flash memory 500. It may be noted that the RAM 312 holding the sector address translation table 330 is an example of the management information storage block described in the appended claims.

The NVRAM page address translation table 340 associates logical addresses with the physical addresses in the NVRAM 400. The physical addresses are each assigned to one NVRAM page (½ sector) in the NVRAM 400.

The flash memory physical address management table 350 contains status of each of the physical addresses in the flash memory 500. The NVRAM physical address management table 360 contains status of each of the physical addresses in the NVRAM 400. The status may be any one of three kinds: "in use," "free," and "defective," for example. The "in use" status is a state in which data is written to the physical address in question; the "free" status is a state in which no data is written to the physical address; and the "defective" status is a state in which data cannot be written to or read from the physical address for some reason.

The data write block 320 writes data to the NVRAM 400 and flash memory 500 under control of the host computer

100. Upon receipt of a write command and write data from the host computer 100, the data write block 320 references the tables to translate the logical address designated by the write command into a physical address. The data write block 320 proceeds to write the write data to the physical address and update the tables. It may be noted that the data write block 320 is an example of the write block described in the appended claims. The write process performed by the data write block 320 will be discussed later in more detail.

The data read block 370 reads data from the NVRAM 400 and flash memory 500 under control of the host computer 100. Upon receipt of a read command from the host computer 100, the data read block 370 references the tables to translate the logical address designated by the read command into a physical address. The data read block 370 then issues simultaneously a read request designating the physical address to each of the NVRAM 400 and flash memory 500. After receiving the read data from the NVRAM 400 and flash memory 500, the data read block 370 outputs the read data to the host computer 100. It may be noted that the data read block 370 is an example of the read block described in the appended claims. The read process performed by the data read block 370 will be discussed later in more detail.

[Typical Structure of the NVRAM]

Figure 4:
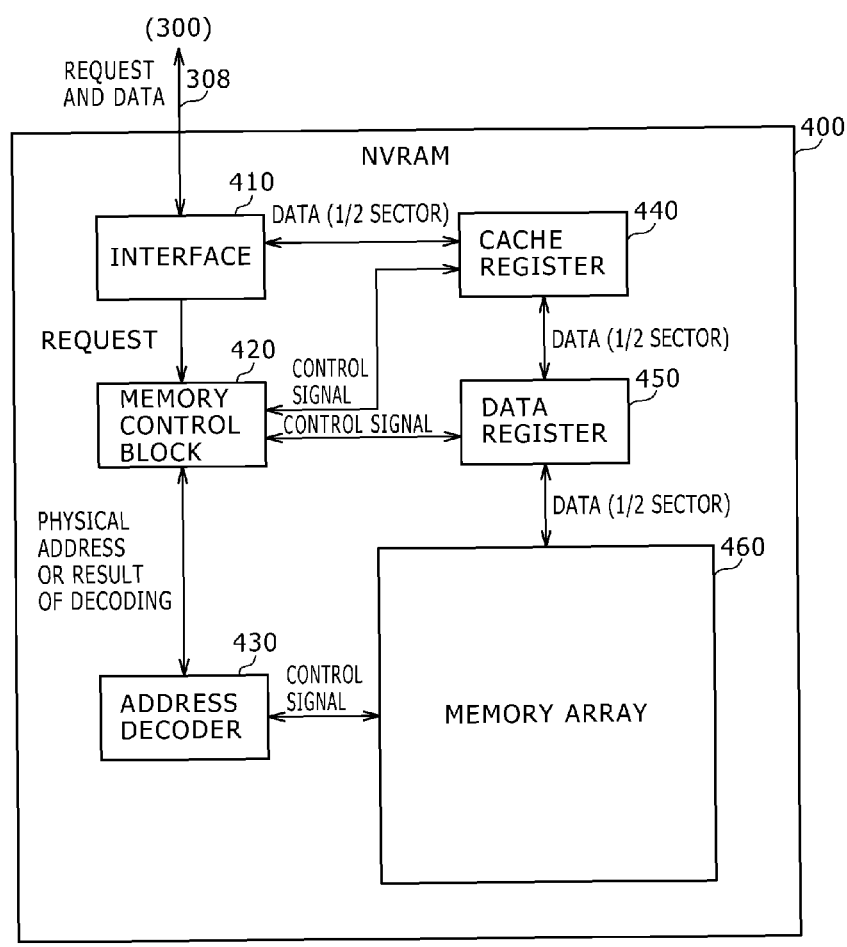
FIG. 4 is a block diagram showing a typical structure of an NVRAM as part of the embodiment.

FIG. 4 is a block diagram showing a typical structure of the NVRAM 400 as part of the embodiment. The NVRAM 400 includes an interface 410, a memory control block 420, an address decoder 430, a cache register 440, a data register 450, and a memory array 460. The flash memory 500 has substantially the same structure as the NVRAM 400.

The interface 410 exchanges requests and data with the memory control block 300.

The memory control block 420 controls the NVRAM 400 as a whole. Upon receipt of a write request via the interface 410, the memory control block 420 outputs the physical address designated by the write request to the address decoder 430 for decoding, and receives the result of the decoding from the address decoder 430. Also, the memory control block 420 controls the cache register 440 to hold the write data (½ sector) transferred from the storage control unit 300. If a data transfer to the data register 450 is possible, the memory control block 420 controls the cache register 440 to transfer the write data received from the storage control unit 300 to the data register 450. Furthermore, the memory control block 420 controls the data register 450 to hold the write data (½ sector) transferred from the cache register 4440 and to write the write data in question to the memory array 460.

Here, the memory control block 420 can parallelly perform two processes: a process in which to receive data from the storage control unit 300 into the cache register 440, and a process in which to write data to the data register 450 (i.e., so-called "interleave operation"). With this feature, the NVRAM 400 can receive from the storage control unit 300 the data to be written next while writing data.

Meanwhile, upon receiving a read request via the interface 410, the memory control block 420 outputs the physical address designated by the read request to the address decoder 430 for decoding, and receives the result of the decoding from the address decoder 430. Also, the memory control block 420 controls the data register 450 to hold the read data (½ sector) read from the memory array 460. If a data transfer to the cache register 440 is possible, the memory control block 420 controls the data register 450 to transfer the read data read from the memory array 460 to the cache register 440. Furthermore, the memory control block 420 controls the cache register 440 to hold the read data (½ sector) transferred from the data register 450 and to output the read data to the storage control unit 300 via the interface 410.

Here, the memory control block 420 can also perform two processes in parallel: a process in which to read data into the data register 450, and a process in which to output data from the cache register 440 to the storage control unit 300 (interleave operation). With this feature, the NVRAM 400 can read from the memory array 460 the data to be output next while outputting the read data to the storage control unit 300.

The time period from the time a read request is issued to the time a read data transfer becomes possible will be called the "busy time" hereunder. It is assumed that the time it takes to transfer read data between the cache register 440 and the data register 450 is very short and that the time required to transfer a read request between the storage control unit 300 and the NVRAM 400 is also very short. Without these times taken into consideration, the time period from the time a read request is issued to the time an NVRAM page is read into the data register 450 corresponds to the busy time.

The address decoder 430 decodes the physical address received from the memory control block 420 and, based on the result of the decoding, activates appropriate memory cells in the memory array 460. Also, the address decoder 430 outputs the result of the decoding to the memory control block 420.

The cache register 440 temporarily holds the data to be output to the storage control unit 300 via the interface 410 or the data received from the storage control unit 300. The data register 450 temporarily holds the data to be written to the memory array 460 or the data read from the memory array 460. The cache register 440 and data register 450 are interconnected using a number of signal lines corresponding to the size of the NVRAM page. For example, if the size of the NVRAM page is 265 bytes, as many as 265×8 parallel transfer signal lines are used to connect the registers. This connection permits high-speed data transfers between the cache register 440 and the data register 450.

The memory array 460 is made up of a plurality of memory cells arranged in a two-dimensional grid pattern. Each of the memory cells retains data of a predetermined size.

Figure 5A:
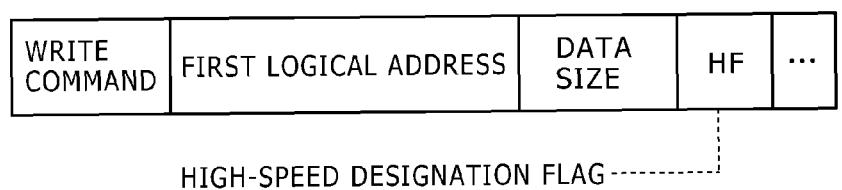
FIGS. 5A and 5B are schematic views showing typical parameters set by commands for use with the embodiment.
Figure 5B:

FIGS. 5A and 5B are schematic views showing typical parameters set by commands for use with the embodiment. FIG. 5A shows typical parameters set by a write command. The parameters to be set may include a first logical address, a data size, and a high-speed designation flag HF. The first logical address is the first of the logical addresses targeted for writing of data. The data size may denote the number of sectors of write data, for example.

The high-speed designation flag HF is a flag that designates whether or not to write data so that the data may be later read at high speed. For example, if data is to be written so as to be read at high speed, the high-speed designation flag HF is set to T (true); otherwise the high-speed designation flag HF is set to F (false). Where the high-speed designation flag HF is set to T, the storage control unit 300 writes as many sectors of write data as the NVRAM continuous sector count to the NVRAM 400 and the remaining sectors of the write data to the flash memory 500. Where the high-speed designation flag HF is set to F, the storage control unit 300 writes all write data to the flash memory 500.

Although the embodiment is configured to use the high-speed designation flag HF in designating whether or not to write data so that the data may later be read at high speed, this is not limitative of the present disclosure. Alternatively, a dedicated write command (called the "high-speed designating write command" hereunder) different from the ordinary write command may be used to make the designation. In this case, the storage control unit 300 need only verify whether the write command is the high-speed designating write command or not in order to determine whether or not to write data to the NVRAM 400.

FIG. 5B shows typical parameters set by a read command for use with the embodiment. The parameters to be set may include a first logical address and a data size. The first logical address is the first of the logical addresses targeted for reading of data. The data size may indicate the number of sectors of read data, for example.

Figure 6A:
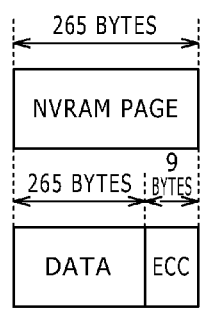
FIGS. 6A and 6B are schematic views showing typical structures of pages for use with the embodiment.
Figure 6B:
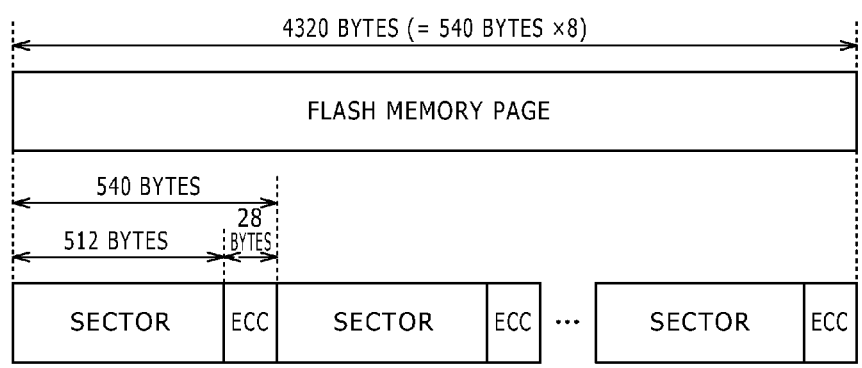

FIGS. 6A and 6B are schematic views showing typical structures of pages for use with the embodiment. FIG. 6A shows a typical structure of an NVRAM page. For example, the NVRAM page may be 265-byte data composed of 256-byte data and a nine-byte error correcting code (ECC). FIG. 6B shows a typical structure of a flash memory page. For example, the flash memory page may be 4,320-byte data made up of eight 540-byte data items. Each 540-byte data item is composed of 512-byte data (sector) and a 28-byte error correcting code.

FIG. 7 is a tabular view showing a typical sector address translation table 330 for use with the embodiment. The sector address translation table 330 contains sector management information about each logical address. The sector management information includes a flash memory physical address, a physical address offset, an enable flag, an NVRAM flag, an NVRAM sector number, and an NVRAM continuous sector count.

The flash memory physical address is a physical address assigned to a logical address in the flash memory 500. The physical address offset indicates the relative position of each physical address in reference to a given physical address in the flash memory page. For example, if the flash memory page is composed of eight sectors, then values 0 through 7 in hexadecimal notation are given as the physical address offsets.

The enable flag is a flag that designates whether a physical address in the NVRAM 400 or flash memory 500 is assigned to the logical address. For example, if a physical address is assigned to the logical address, the enable flag is set to T (true); if no physical address is assigned to the logical address, the enable flag is set to F (false).

The NVRAM flag is a flag that designates whether a physical address in the NVRAM 400 is assigned to the logical address. For example, if a physical address in the NVRAM 400 is assigned to the logical address, the NVRAM flag is set to T (true); if no physical address in the NVRAM 400 is assigned to the logical address, the NVRAM flag is set to F (false).

The NVRAM sector number indicates the relative position of each logical address in reference to the first logical address in the NVRAM 400. For example, if the NVRAM continuous sector count is 3, then values 0 through 2 in hexadecimal notation are given as the NVRAM sector numbers. The NVRAM continuous sector count denotes the number of sectors to be written continuously to the NVRAM 400.

By referencing the NVRAM sector number and the NVRAM continuous sector count, the data read block 370 can easily obtain the logical address from which data is first read from the flash memory 500 (the address is called the "start logical address" hereunder). Specifically, the data read block 370 may calculate the start logical address using the following expression 1:

(Start logical address)=(first logical address)+ (NVRAM continuous sector count)−(NVRAM sector number) (expression 1)

Without recourse to the expression 1 above, it is also possible to obtain the start logical address by referencing the NVRAM flags of the respective logical addresses. However, if the NVRAM continuous sector count is a large number, it may take time to perform the calculations. Where the NVRAM sector number and the NVRAM continuous sector count are denoted, the start logical address can be calculated from these numbers. This makes it possible to reduce the overhead of the software.

Although the storage control unit 300 is configured to obtain the start logical address from the NVRAM sector number and the NVRAM continuous sector count, other methods may be used to acquire the start logical address. For example, upon writing data, the storage control unit 300 may denote the start logical address itself in association with a logical address of which the NVRAM fag is T (true); upon reading the data, the storage control unit 300 may read the start logical address.

FIG. 8 is a tabular view showing a typical NVRAM page address translation table 340 for use with the embodiment. The NVRAM page address translation table 340 contains a logical address offset and NVRAM page management information about each logical address. The NVRAM page management information includes an NVRAM physical address, a physical page number, and a continuous physical page count.

The logical address offset indicates the relative position of each logical address in reference to a given logical address in the sector. For example, if one sector is divided into two NVRAM pages, the value 0 or 1 in hexadecimal notation is given as the logical address offset.

The NVRAM physical address is a physical address assigned to the address determined by the logical address and logical address offset. The NVRAM continuous physical page count represents the number of NVRAM pages to be written continuously to the NVRAM 400. The NVRAM continuous physical page count is determined using the following expression 2:

(NVRAM continuous physical page count)=(NVRAM continuous sector count)×(sector size)/(NVRAM page size) (expression 2)

In the expression 2, the sector size and the NVRAM page size are each a data size excluding the error correcting code. For example, if the NVRAM continuous sector count is 3, the sector size is 512 bytes, and the NVRAM page size is 256 bytes, then the NVRAM continuous physical page count is determined to be 6 based on the expression 2 above. The physical page number indicates the relative position of each NVRAM page in reference to a given NVRAM page. For example, if the NVRAM continuous physical page count is 6, values 0 through 5 in hexadecimal notation are given as the physical page numbers.

FIG. 9 is a tabular view showing a typical flash memory physical address management table 350 for use with the embodiment. The flash memory physical address management table 350 contains status of each flash memory physical address. The flash memory physical addresses are the physical addresses in the flash memory 500. The status may be any one of three kinds: "in use," "free," and "defective," for example.

FIG. 10 is a tabular view showing a typical NVRAM physical address management table 360 for use with the embodiment. The NVRAM physical address management table 360 contains status of each NVRAM physical address. The NVRAM physical addresses are the physical addresses in the NVRAM 400. The status may be any one of three kinds: "in use," "free," and "defective," for example.

[Typical Structure of the Data Write Block]

Figure 11:
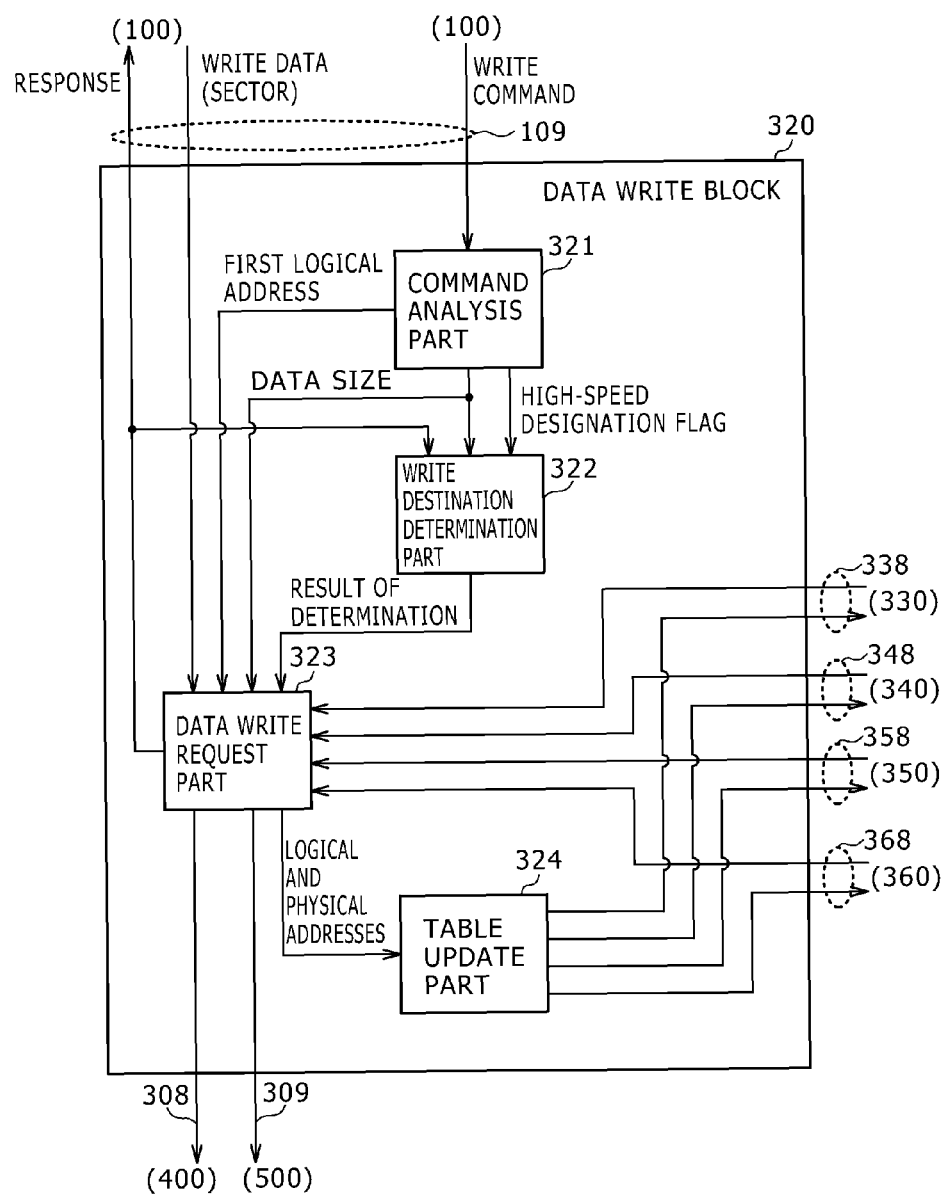
FIG. 11 is a block diagram showing a typical structure of a data write block as part of the embodiment.

FIG. 11 is a block diagram showing a typical structure of the data write block 320 as part of the embodiment. The data write block 320 includes a command analysis part 321, a write destination determination part 322, a data write request part 323, and a table update part 324.

The command analysis part 321 analyzes the write command. Based on the result of the analysis, the command analysis part 321 outputs the first physical address and data size designated by the write command to the data write request part 323. Also, the command analysis part 321 outputs the data size and high-speed designation flag designated by the write command to the write destination determination part 322.

The write destination determination part 322 determines which of the NVRAM 400 and flash memory 500 is the destination to which to write data. The write destination determination part 322 receives the data size and high-speed designation flag from the command analysis part 321, and receives a response from the data write request part 323.

If the high-speed designation flag is set to F, the write destination determination part 322 determines that the flash memory 500 is the write destination, and outputs the result of the destination to the data write request part 323.

On the other hand, if the high-speed designation flag is set to T, the write destination determination part 322 determines that the NVRAM 400 is the destination to which to write as many sectors of those indicated by the data size as the NVRAM continuous sector count, and outputs the result of the destination to the data write request part 323. Then the write destination determination part 322 determines that the flash memory 500 is the destination to which to write the remaining sectors, and outputs the result of the destination to the data write request part 323. The ordinal position of the sector to be written relative to the first sector is obtained by the write destination determination part 322 calculating the response output from the data write request part 323.

The data write request part 323 writes write data to the NVRAM 400 or flash memory 500. The data write request part 323 receives a first logical address and a data size from the command analysis part 321, and receives write data from the host computer 100. Also, the data write request part 323 receives the result of the write destination determination from the write destination determination part 322. The data write request part 323 considers as many logical addresses as the data size subsequent to the first logical address to be the addresses targeted for writing of data. In accordance with the result of the determination from the write destination determination part 322, the data write request part 323 determines the physical addresses corresponding to the logical addresses targeted for writing of data.

If the NVRAM 400 is the write destination, the data write request part 323 divides each sector into units of 256 bytes to generate NVRAM pages each supplemented with an error correcting code. Also, the data write request part 323 references the NVRAM page address translation table 340 via a signal line 348 to determine whether there exist physical addresses assigned to the logical addresses targeted for writing. If no such physical addresses are assigned, the data write request part 323 references the NVRAM physical address management table 360 via a signal line 368 in order to assign some of the free physical addresses to the logical addresses. The data write request part 323 proceeds to write the NVRAM pages to the physical addresses assigned to the logical addresses.

If the flash memory 500 is the write destination, the data write request part 323 supplements each sector with an error correcting code. Also, the data write request part 323 references the sector address translation table 330 via a signal line 338 to determine whether there exist physical addresses assigned to the logical addresses targeted for writing. If no such physical addresses are assigned, the data write request part 323 references the flash memory physical address management table 350 via a signal line 358 so as to assign some of the free physical addresses to the logical addresses. The data write request part 323 proceeds to write data in units of eight sectors to the physical addresses assigned to the logical addresses. Since the flash memory page size is larger than the sector size, the data write request part 323 may have one flash memory page of data held typically in a buffer as needed, before writing the data.

Every time one sector of data is written, the data write request part 323 outputs to the write destination determination part 322 a response announcing that one sector of data has been written, and outputs the logical address and the physical address corresponding to that logical address to the table update part 324. After all sectors have been written, the data write request part 323 outputs to the host computer 100 a response announcing the termination of the write command.

The table update part 324 receives the logical and physical addresses from the data write request part 323 and updates the tables accordingly.

[Typical Structure of the Data Read Block]

Figure 12:
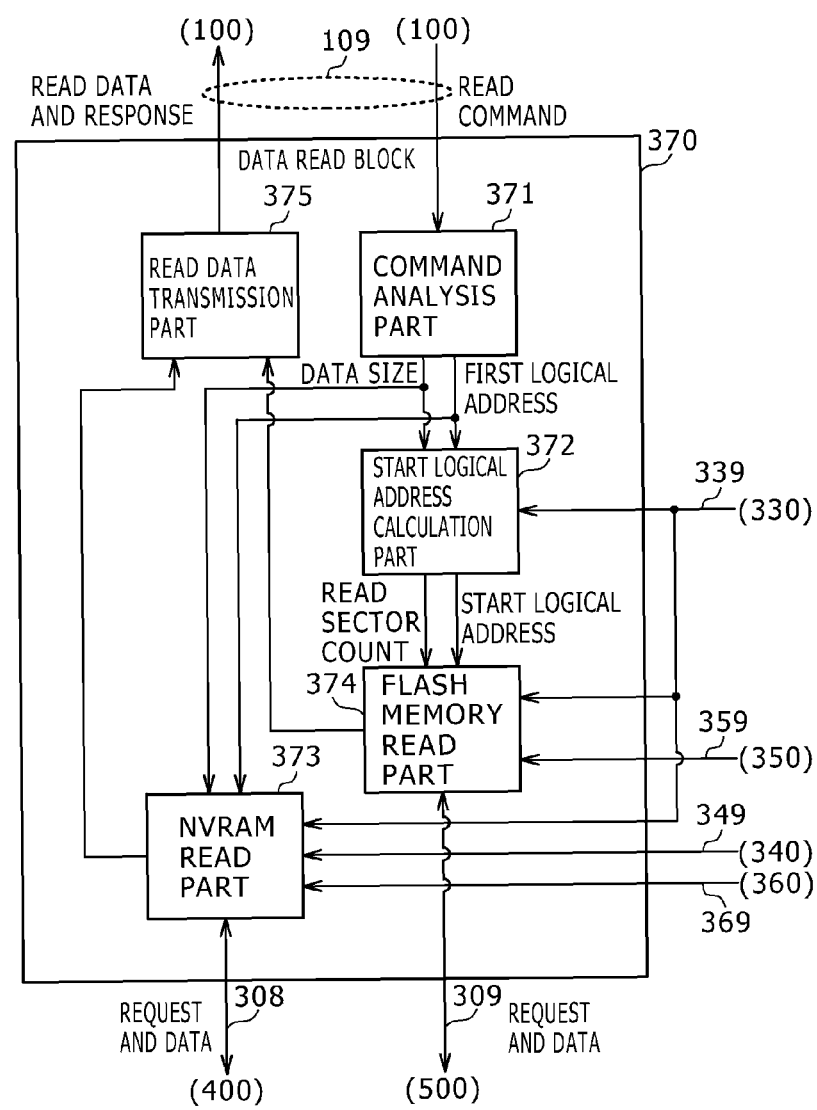
FIG. 12 is a block diagram showing a typical structure of a data read block as part of the embodiment.

FIG. 12 is a block diagram showing a typical structure of the data read block 370 as part of the embodiment. The data read block 370 includes a command analysis part 371, a start logical address calculation part 372, an NVRAM read part 373, a flash memory read part 374, and a read data transmission part 375.

The command analysis part 371 analyzes the read command. Based on the result of the analysis, the command analysis part 371 outputs the first logical address and data size designated by the read command to the start logical address calculation part 372 and NVRAM read part 373.

The start logical address calculation part 372 calculates the logical address to which has been written the data to be read first from the flash memory 500 (the address is called the start logical address). The start logical address calculation part 372 receives the first logical address and the data size from the command analysis part 371. The start logical address calculation part 372 reads the NVRAM continuous sector count and NVRAM sector number corresponding to the first logical address from the sector address translation table 330 via a signal line 339. Based on the NVRAM continuous sector count and NVRAM sector number, the start logical address calculation part 372 may calculate the start logical address using the expression 1 shown above.

If the start logical address obtained by use of the expression 1 above is the logical address designated by the read command, the start logical address calculation part 372 outputs the start logical address to the flash memory read part 374. Also, the start logical address calculation part 372 obtains a read sector count by subtracting from the data size the difference between the NVRAM continuous sector count and the NVRAM sector number, and outputs the read sector count thus acquired to the flash memory read part 374.

The NVRAM read part 373 reads data from the NVRAM 400. The NVRAM read part 373 receives the first logical address and the data size from the command analysis part 371. The NVRAM read part 373 reads the NVRAM flag corresponding to the first logical address from the sector address translation table 330 via the signal line 339. If the NVRAM flag is set to T (true), the NVRAM read part 373 reads from the sector address translation table 330 the NVRAM continuous sector count and NVRAM sector number corresponding to the first logical address. From the NVRAM continuous sector count, NVRAM sector number and data size, the NVRAM read part 373 determines whether the following expression 3 holds:

(Data size)≥(NVRAM continuous sector count)− (NVRAM sector number)    (expression 3)

If the expression 3 above holds, as many logical sectors as the right side number of the expression 3 (i.e., difference) starting from the first logical address are targeted for reading of data. If the expression 3 does not hold, the NVRAM read part 373 considers as many logical addresses as the data size starting from the first logical address to be the addresses targeted for reading of data. For example, if the right side number of the expression 3 above is 3 and the data size is 4, three logical addresses are targeted for reading of data. If the right side number of the expression 3 above is 3 and the data size is 2, then two logical addresses are targeted for reading of data.

The NVRAM read part 373 references the NVRAM page address translation table 340 via a signal line 349 to read the physical address corresponding to the logical address targeted for reading of data. The NVRAM read part 373 references the NVRAM physical address management table 360 via a signal line 369 to determine whether or not the physical address in question is defective. If the physical address is not defective, the NVRAM read part 373 issues a read request in which the physical address in question is designated, outputs the read request to the NVRAM 400, receives the read data output from the NVRAM 400, and holds the data in the buffer as needed. The NVRAM read part 373 performs an error correcting process based on the error correcting code attached to the read data, and outputs the read data to the read data transmission part 375 after deleting the error correcting code from the data.

The flash memory read part 374 reads data from the flash memory 500. The flash memory read part 374 receives the start logical address and the read sector count from the start logical address calculation part 372. The flash memory read part 374 considers the logical address away from the start logical address by as many sectors as the read sector count to be the logical address targeted for reading of data. The flash memory read part 374 references the sector address translation table 330 via the signal line 339 to read the physical address corresponding to the logical address targeted for reading of data. The flash memory read part 374 references the flash memory physical address management table 350 via a signal line 359 to determine whether or not the physical address in question is defective. If the physical address is not defective, the flash memory read part 374 issues a read request in which the physical address in question is designated, and outputs the read request to the flash memory 500. The read request is issued simultaneously with the read request issued by the NVRAM read part 373. The flash memory read part 374 receives the read data output from the flash memory 500 and holds the data in the buffer as needed. The flash memory read part 374 performs an error correcting process based on the error correcting code attached to the read data, and outputs the read data to the read data transmission part 375 after deleting the error correcting code from the data.

The read data transmission part 375 outputs to the host computer 100 the read data from the NVRAM read part 373 or from the flash memory read part 374 together with the response to the read command.

Figure 13:
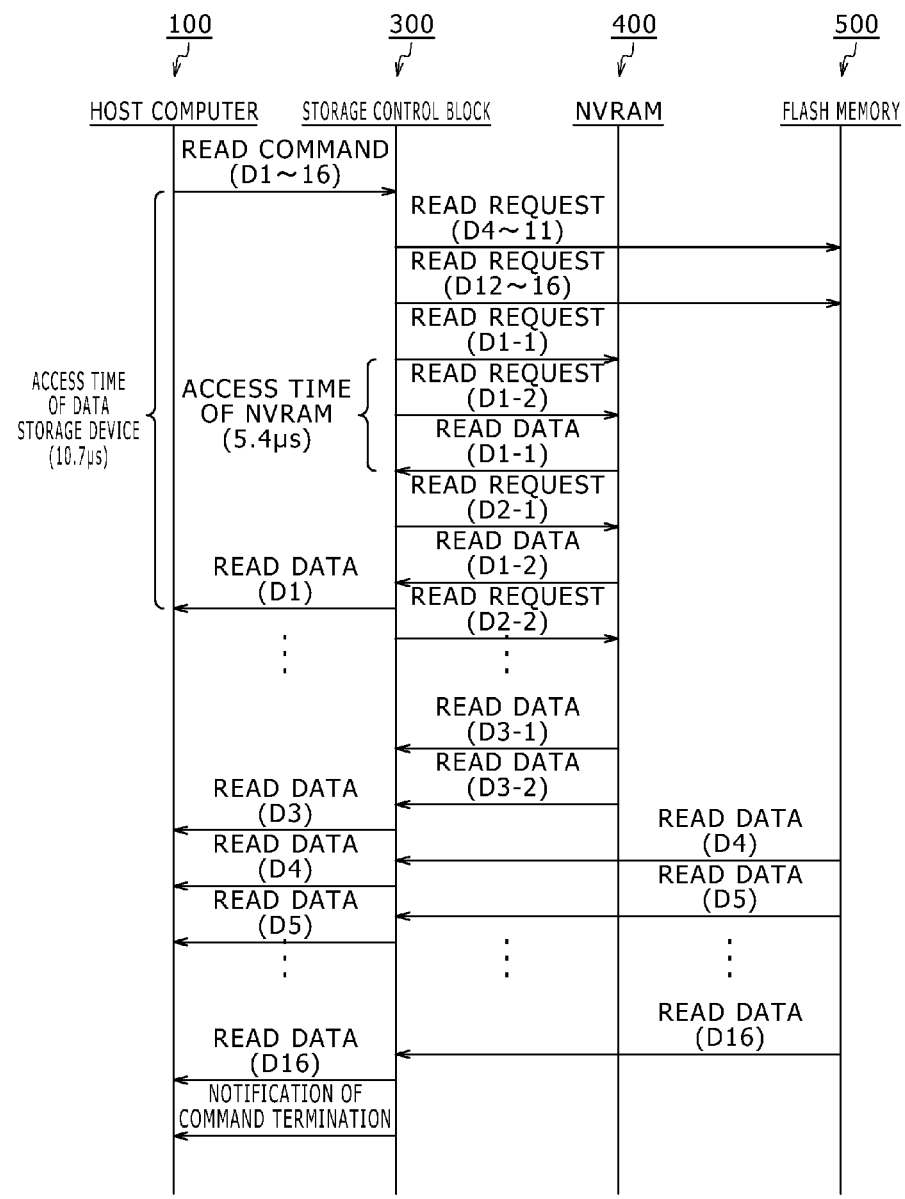
FIG. 13 is a sequence diagram of a read process performed by the embodiment.

FIG. 13 is a sequence diagram showing a typical read process performed by the embodiment. It is assumed here that, of data D1 through d16, the data D1 through D3 have been written in the NVRAM 400 and the remaining data D4 through D6 in the flash memory 500. Suppose now that the host computer 100 outputs to the storage control unit 300 a read command in which the addresses at which the data D1 through D16 have been written are designated.

Since the NVRAM 400 includes the cache register 440 and data register 450 as data transfer buffers as discussed above, it is possible for the NVRAM 400 to perform simultaneously the process of reading data and the process of transferring the read data. Thus the NVRAM 400 can accept the next read request while executing a given read request. However, because the capacity of each of the buffers is only as large as one NVRAM page, it is not possible to accept three or more read requests at the same time. Likewise, it is assumed that the flash memory 500 can accept up to two read requests simultaneously.

The storage control unit 300 issues a read request to the NVRAM 400 to divide the data D1 into data D1-1 and D1-2 before reading these data. Also, at the same time as the request for the data D1-1 and D1-2, the storage control unit 300 issues a read request to read the data D4 through D11 and a read request to read the data D12 through D16.

With the read data D1-1 read out, the storage control unit 300 issues a read request to read the data D2-1. With the data D1-2 read out, the storage control unit 300 outputs the data composed of the data D1-1 and D1-2 as the data D1 to the host computer 100. The time period from the time the read command starts to be executed to the time the data D is read out constitutes an access time (latency) of the data storage device 200. Since the first data D1 is read from the NVRAM 400 having the relatively short access time, the access time of the entire data storage device 200 is shortened.

For example, consider a structure where the busy time of the NVRAM 400 is 0.1 microsecond (μs) and where the time required to transfer ½ sector of data from the NVRAM 400 to the storage control unit 300 is 5.3 microseconds (μs). In this case, the access time of the NVRAM 400 is defined as the time period from the time the read command is executed to the time the divided ½ sector of data is output, i.e., 5.7 microseconds (μs) obtained by supplementing the busy time with the time period for the transfer of ½ sector of data. The access time of the entire data storage device 200 thus amounts to 10.7 microseconds (μs) obtained by adding the time for the transfer of 1 sector of data to the busy time.

After the data D1 through D3 have been read from the NVRAM 400, the remaining data D4 through D16 are read from the flash memory 500. After all data have been read out, the storage control unit 300 notifies the host computer 100 of the termination of the read command.

Figure 14:
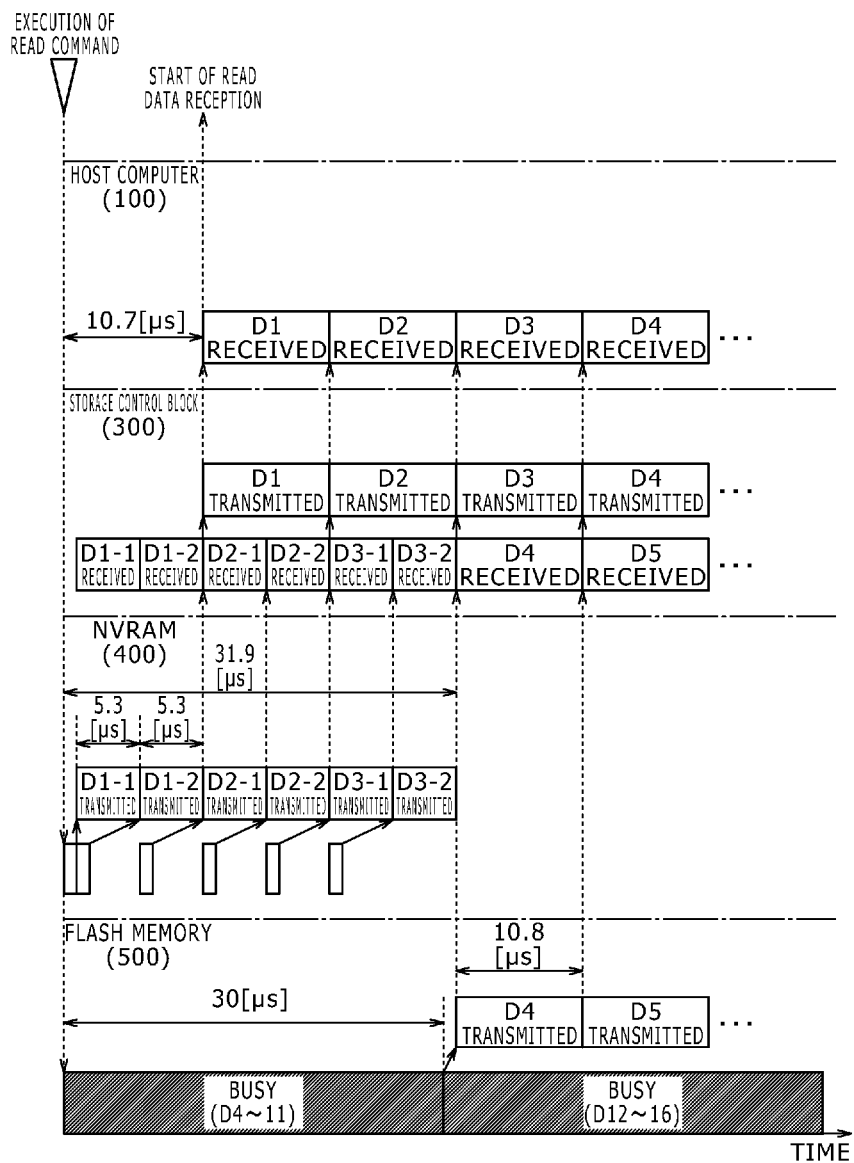
FIG. 14 is a timing chart explaining the timings of data transfers performed by the embodiment.

FIG. 14 is a timing chart explaining the timings of data transfers performed by the embodiment. In the FIG. 14, the horizontal axis is assumed to be the time axis. Also in FIG. 14, the length of each of the shaded portions on the horizontal axis is assumed to represent the busy time. Specifically, it is assumed that the busy time of the NVRAM 400 is 0.1 microsecond (μs) and the busy time of the flash memory 500 is 30 microseconds (μs). It is also assumed that the frequency for data transfers between the NVRAM 400 and the flash memory 500 is 50 megahertz (MHz) and that eight bits of data are transferred in parallel. It is further assumed that the time for transferring a read command between the host computer 100 and the storage control unit 300 and the time for transferring a read request between the NVRAM 400 and the flash memory 500 are sufficiently short.

Given the above assumption, the time required to transfer 265 bytes (NVRAM page) of data from the NVRAM 400 to the storage control unit 300 is calculated using the following expression 4:

$$265 \div 50 \times 10^6 \text{ [Hz]} = 5.3 \times 10^{-6} \text{ [s]} = 5.3 \text{ [µs]} \quad \text{(expression 4)}$$

Using the expression 4 above, the time for transferring two NVRAM pages of data (1 sector) is calculated to be 10.6 microseconds (µs). The throughput of the NVRAM 400 is given by dividing the sector size (512 bytes) by 10.6 microseconds (µs).

On the other hand, the time for transferring one sector (540 bytes) of data furnished with the error correcting code from the flash memory 500 to the storage control unit 300 is calculated using the following expression 5:

$$540 \div 50 \times 10^6 \text{ [Hz]} = 10.8 \times 10^{-6} \text{ [s]} = 10.8 \text{ [µs]} \quad \text{(expression 5)}$$

When the time for transferring one sector of data is obtained from the expression 5 and added to the busy time of the flash memory 500, an access time of 40.8 microseconds (µs) is acquired for the flash memory 500.

The number of sectors that can be read from the NVRAM 400 during the access time of the flash memory 500 is calculated based on the busy time of the NVRAM 400 and on the transfer time obtained from the expression 4 above and by use of the following expression 6:

$$(40.8 \text{ [µs]} - 0.1 \text{ [µs]}) / 10.6 \text{ [µs]} \approx 3.8 \quad \text{(expression 6)}$$

As indicated by the expression 6 above, it is possible to read up to three sectors of data from the NVRAM 400 during the access time of the flash memory 500. Thus in this example, the NVRAM continuous sector count is set to three.

Until three sectors of data have been read from the NVRAM 400, the busy time of the flash memory 500 elapses so that data transfer is made possible. For this reason, data can start to be read from the flash memory 500 upon readout of data from the NVRAM 400. This boosts throughput because there is no idle time following the completion of data readout from the NVRAM 400 until the start of reading data from the flash memory 500.

Even if the NVRAM continuous sector count is made larger than three, throughput is not much improved. That is because there is little difference in the time for transfer per sector between the NVRAM 400 and the flash memory 500 following the elapse of the access time. Thus if the NVRAM continuous sector count is made larger than three, the capacity of the NVRAM 400 is wasted by as much as what corresponds to the excess count. As described above, the capacity of the NVRAM 400 can be used efficiently when the NVRAM continuous sector count is set to its minimum number for improving throughput.

Although the embodiment is configured so that the storage control unit 300 issues read requests simultaneously to the NVRAM 400 and flash memory 500, this is not limitative of the timing of request issuance. Other timings may be used as long as the busy time of the flash memory 500 is terminated before as many sectors as the NVRAM continuous sector count have been read. Specifically, adding the time for transferring three sectors of data as obtained from the expression 4 to the busy time of the NVRAM 400 provides the time of 31.9 microseconds (µs) in which the three sectors are read. The difference between this read time and the busy time of the flash memory 500 is 1.9 microseconds (µs). Thus the read request may be issued to the flash memory 500 during the time period from the time the read request is issued to the NVRAM 400 until the time of 1.9 microseconds (µs) elapses.

[Typical Operation of the Data Write Block]

Figure 15:
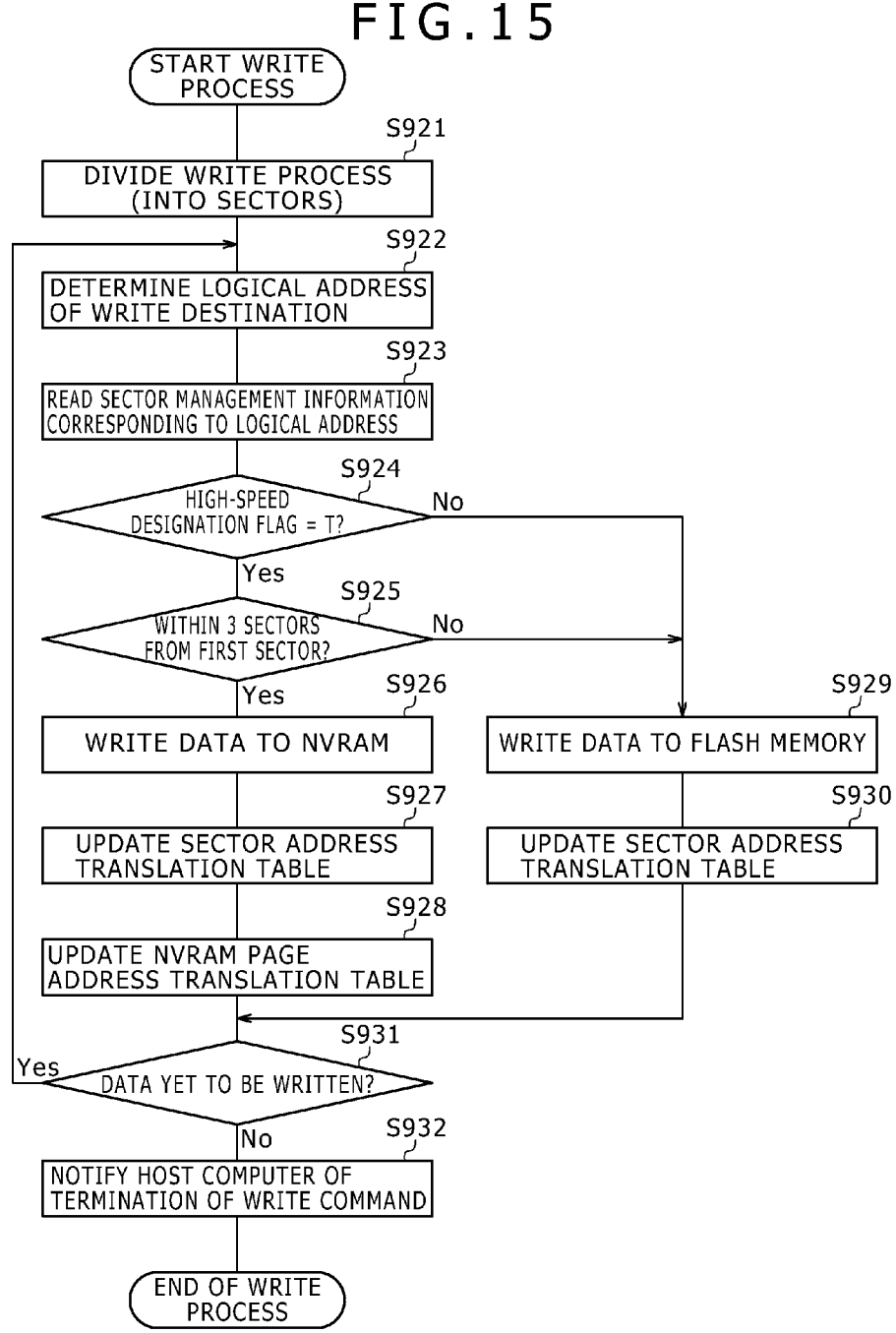
FIG. 15 is a flowchart showing a typical write process performed by the embodiment.

FIG. 15 is a flowchart showing a typical write process performed by the embodiment. The write process may be started when, say, the storage control unit 300 receives a write command and write data from the host computer 100.

The data write block 320 in the storage control unit 300 divides the write-data write process into sectors based on the first logical address and data size designated by the write command (step S921). The data write block 320 determines, as the logical address targeted for writing, any one of as many logical addresses yet to write data as the data size count relative to the first logical address (e.g., the logical address with the smallest address value)(step S922).

By referencing the sector address translation table 330, the data write block 320 reads the sector management information corresponding to the logical address targeted for writing (step S923).

The data write block 320 determines whether the high-speed designation flag received from the host computer 100 is set to T (true) (step S924). If the high-speed designation flag is set to T ("Yes" in step S924), the data write block 320 determines whether the logical address targeted for writing is within as many sectors as the NVRAM continuous sector count (e.g., 3) relative to the first logical address (step S925).

If the logical address targeted for writing is within as many sectors as the NVRAM continuous sector count relative to the first logical address ("Yes" in step S925), the data write block 320 reads the physical address corresponding to the logical address from the NVRAM page address translation table 340. If no corresponding physical address is found in the translation table 340, the data write block 320 references the NVRAM physical address management table 360 to assign a free physical address to the logical address. The data write block 320 writes the data to that physical address in the NVRAM 400 which corresponds to the logical address (step S926). The data write block 320 updates the sector address translation table 330 based on what has been written (step S927). Specifically, the data write block 320 updates the enable flag and the NVRAM flag corresponding to the logical address to T (true). Also, the data write block 320 writes "3" to the field of the NVRAM continuous sector count corresponding to the logical address, and writes values 0 through 2 to the fields of the NVRAM sector numbers.

The data write block 320 updates the NVRAM page address conversion table 340 based on what has been written (step S928). If the logical address to which the data has been written is not registered in the NVRAM page address translation table 340, the data write block 320 registers the logical address in question and the NVRAM page management information to the translation table 340.

If the high-speed designation flag is set to F (false)("No" in step S924), of if the logical address targeted for writing is not within as many sectors as the NVRAM continuous sector count relative to the first logical address ("No" in step S925), the data write block 320 regards the flash memory 500 as the write destination. The data write block 320 acquires from the physical address sector management information the physical address corresponding to the logical address targeted for writing. If the corresponding physical address is not found in the sector management information, the data write block 320 references the flash memory physical address management table 350 to assign a free physical address to the logical address. The data write block 320 writes the data to that physical address in the flash memory 500 which corresponds to the logical address (step S929). The data write block 320 updates the sector address translation table 330 based on what has been written (step S930). Specifically, the data write block 320 updates the enable flag corresponding to the logical address to T (true) and the NVRAM flag to F (false). Also, the data write block 320 writes the physical address and physical address offset corresponding to the logical address.

After the table updates (step S928 or S930), the data write block 320 determines whether there exists any data (sector) of the write data yet to be written (step S931). If there exists any data yet to be written ("Yes" in step S931), the data write block 320 returns to step S922. If there exists no data yet to be written ("No" in step S931), the data write block 320 notifies the host computer 100 of the termination of the write command (step S932). At the end of step S932, the data write block 320 terminates the write process.

[Typical Operation of the Data Read Block]

Figure 16:
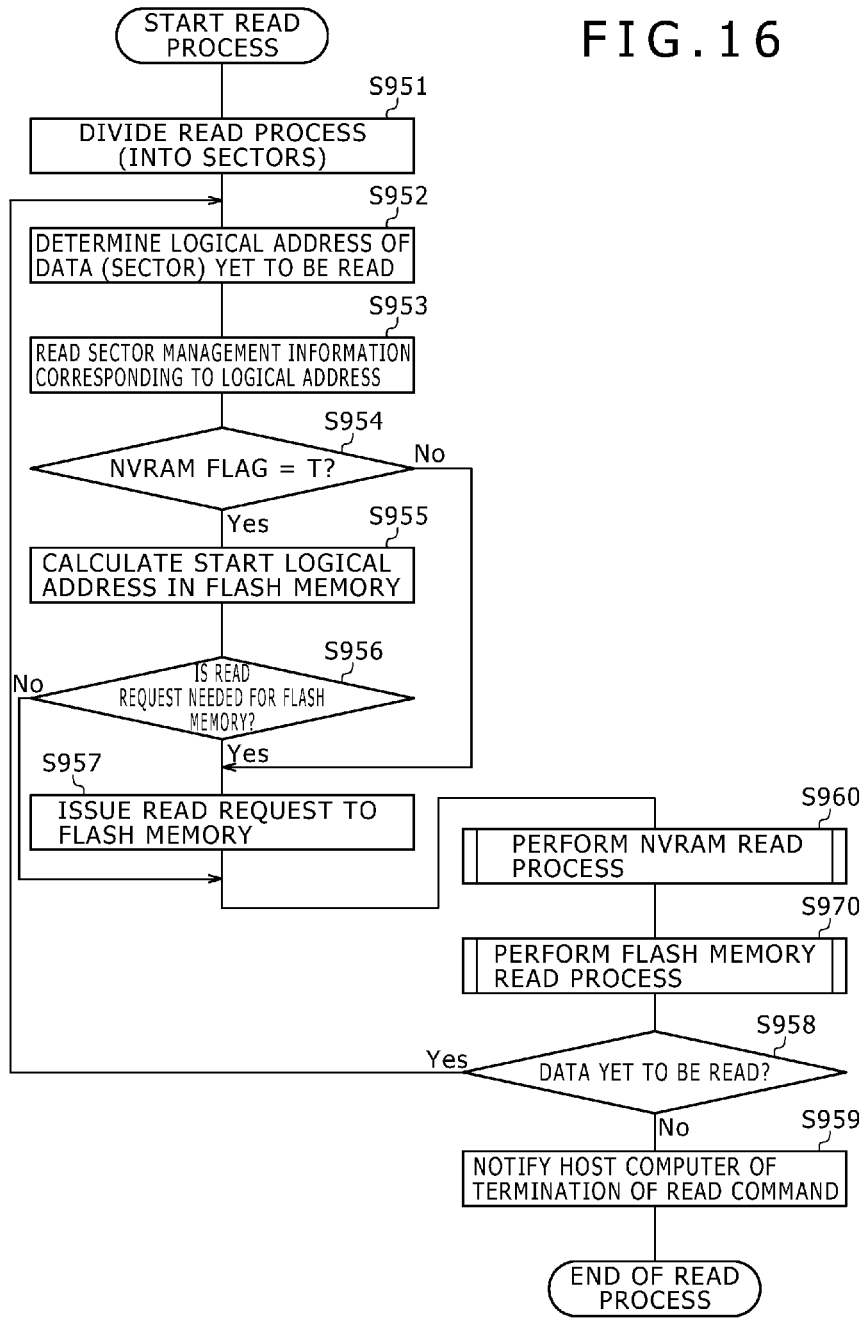
FIG. 16 is a flowchart showing a typical read process performed by the embodiment.

FIG. 16 is a flowchart showing a typical read process performed by the embodiment. The read process may be started when, say, the storage control unit 300 receives a read command from the host computer 100.

The data read block 370 in the storage control unit 300 divides the read-data read process into sectors based on the start logical address and data size designated by the read command (step S951). The data read block 370 determines, as the logical address targeted for reading, any one of as many logical addresses yet to be read as the data size count relative to the first logical address (e.g., the logical address with the smallest address value) (step S952).

By referencing the sector address translation table 330, the data read block 370 reads the sector management information corresponding to the logical address targeted for reading (step S953). The data read block 370 determines whether or not the NVRAM flag in the sector management information is set to T (true) (step S954).

If the NVRAM flag is set to T ("Yes" in step S954), the data read block 370 calculates the start logical address in the flash memory 500 using the expression 1 discussed above (step S955). And the data read block 370 determines whether it is necessary to issue a read request to the flash memory 500. Specifically, if the start logical address is the logical address designated by the read command, it is determined that the read request needs to be issued. Otherwise it is determined that there is no need to issue the read request to the flash memory 500 (step S956).

If the NVRAM is set to F (false) ("No" in step S954), or if it is determined that the read request needs to be issued ("Yes" in step S956), the data read block 370 issues the read request to the flash memory 500. It should be noted that once a read request is issued, that read request need not to be issued again. In the read request, a logical address subsequent to the start logical address is designated (step S957).

If there is no need to issue the read request to the flash memory ("No" in step S956), or at the end of step S957, the data read block 370 performs an NVRAM read process (step S960). And the data read block 370 performs a flash memory read process (step S970).

The data read block 370 determines whether there is any data (sector) yet to be read (step S958). If there exists any data to be read ("Yes" in step S958)), the data read block 370 returns to step S952. If there is no data yet to be read ("No" in step S958), the data read block 370 notifies the host computer 100 of the termination of the read command (step S959). At the end of step S959, the data read block 370 terminates the read process.

Figure 17:
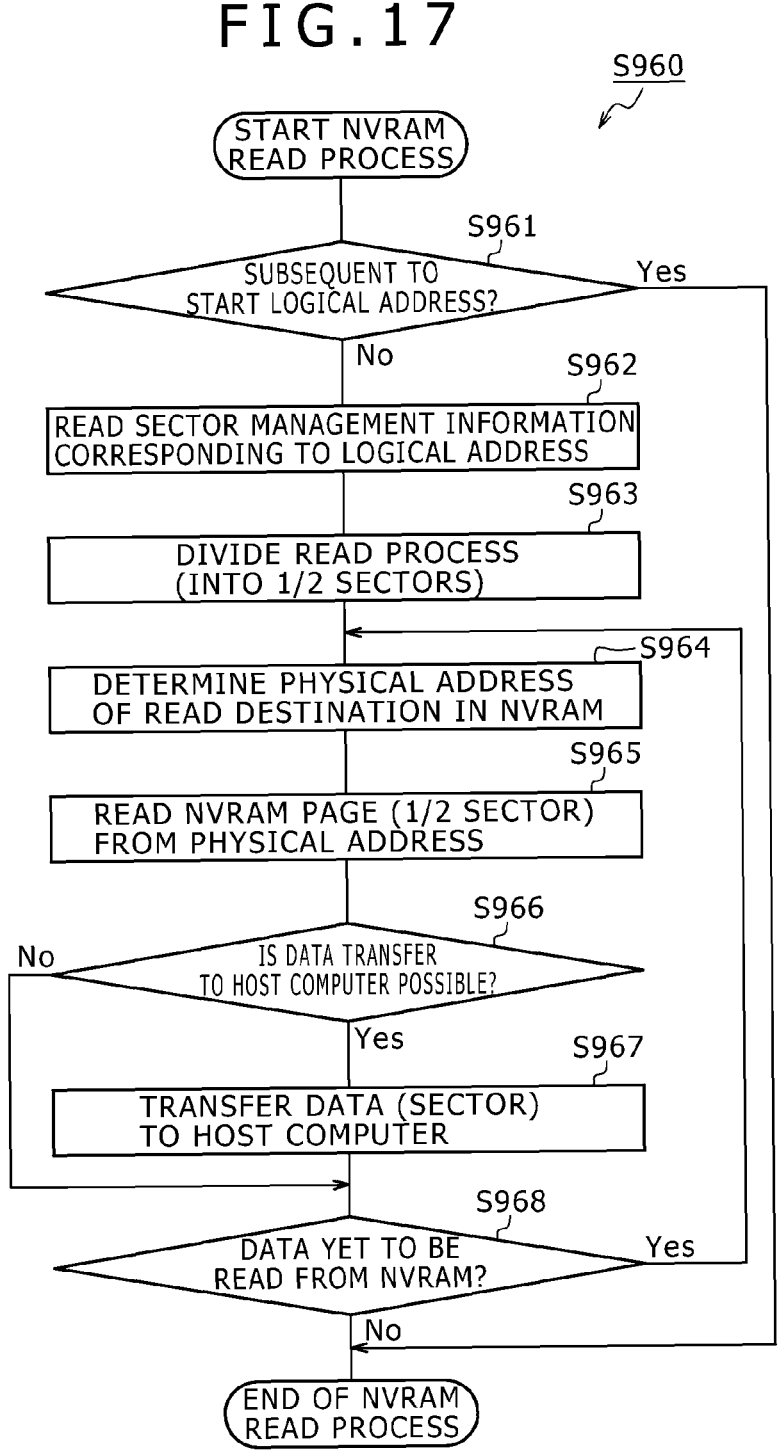
FIG. 17 is a flowchart showing a typical NVRAM read process performed by the embodiment.

FIG. 17 is a flowchart showing a typical NVRAM read process performed by the embodiment. The data read block 370 determines whether the logical address targeted for reading is an address subsequent to the start logical address (step S961).

If the logical address targeted for reading is not an address subsequent to the start logical address ("No" in step S961), the data read block 370 reads from the sector address translation table 330 the sector management information corresponding to the logical address targeted for reading. Depending on whether or not the expression 3 above holds, the data read block 370 considers as many logical addresses as the right side number (difference) of the expression 3 or as many logical addresses as the data size to be the logical addresses targeted for reading from the NVRAM 400 (step S962). And the data read block 370 divides the read process on the NVRAM 400 into units of 256 bytes (½ sector) (step S963).

The data read block 370 reads from the NVRAM page address translation table 340 the physical addresses corresponding to the logical addresses targeted for reading, and determines these addresses to be the physical addresses targeted for reading. Whereas two physical addresses are assigned to each logical address representing one sector, the physical addresses are read consecutively starting from the physical address corresponding to the logical address offset of the smaller value (step S964). The data read block 370 reads an NVRAM page (½ sector) from the physical address thus determined (step S965).

The data read block 370 determines whether a data transfer to the host computer 100 is possible. For example, at the end of the error correcting process, the data transfer is determined to be possible (step S966).

If the data transfer is possible ("Yes" in step S966), the data read block 370 transfers the read data in units of sectors to the host computer 100 (step S967).

If the data transfer is not possible ("No" in step S966), or at the end of step S967, the data read block 370 determines whether there is any NVRAM page to be read from the NVRAM 400 (step S968). If there exists data to be read from the NVRAM 400 ("Yes" in step S968), the data read block 370 returns to step S964. If the logical address targeted for reading is an address subsequent to the start logical address ("Yes" in step S961), or if there is no data to be read from the NVRAM 400 ("No" in step S968), the data read block 370 terminates the NVRAM read process.

Figure 18:
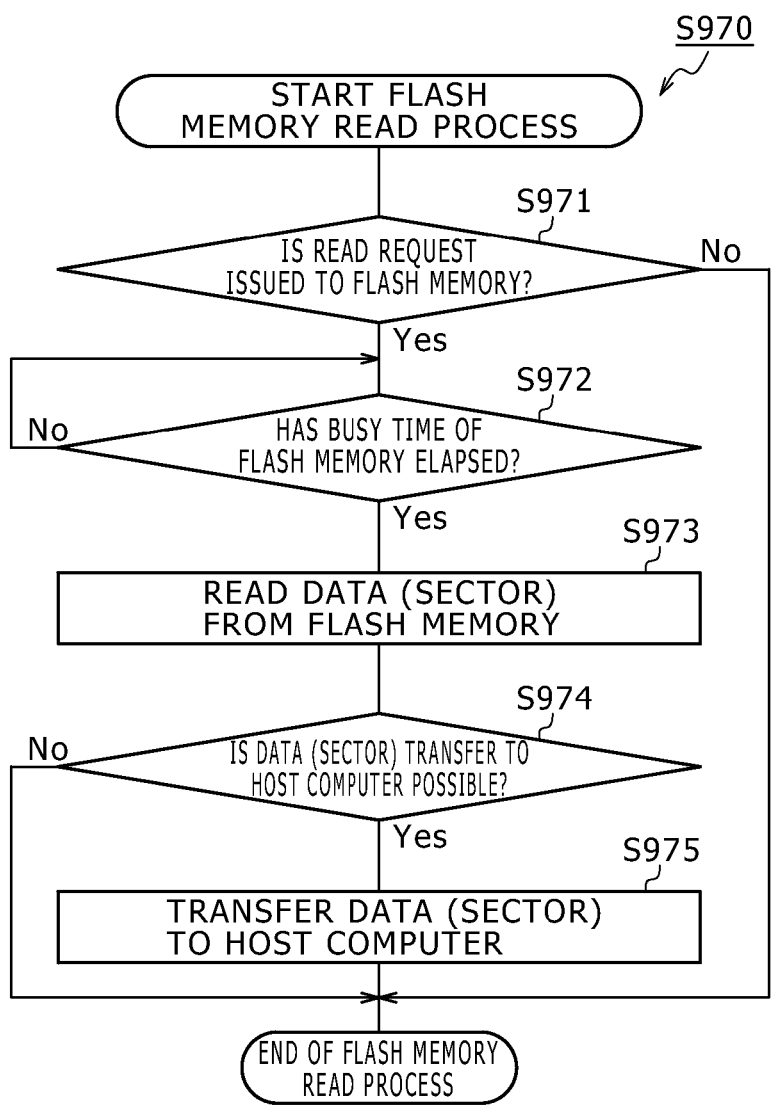
FIG. 18 is a flowchart showing a typical flash memory read process performed by the embodiment.

FIG. 18 is a flowchart showing a typical flash memory read process performed by the embodiment. The data read block 370 determines whether a read request is issued to the flash memory 500 (step S971).

If the read request is issued to the flash memory 500 ("Yes" in step S971), the data read block 370 determines whether it is possible to read data from the flash memory 500 upon elapse of its busy time (step S972). If it is not possible to read data from the flash memory 500 ("No" in step S972), the data read block 370 returns to step S972.

If it is possible to read data from the flash memory 500 ("Yes" in step S972), the data read block 370 reads data from the flash memory 500 (step S973). The data read block 370 determines whether it is possible to transfer the data to the host computer 100. For example, at the end of an error correcting process, it is determined that the data transfer is possible (step S974).

If it is determined that the data transfer is possible ("Yes" in step S974), the data read block 370 transfers the read data in units of sectors to the host computer 100 (step S975). If the data transfer is not possible ("No" in step S974), or at the end of step S975, the data read block 370 terminates the flash memory read process.

FIG. 19 is a tabular view showing a typical sector address translation table 330 in effect before writing of data to the flash memory 500 as part of the embodiment. Logical addresses such as "j+3," "j+5" and "j+7" are each assigned a physical address, and the enable flag corresponding to each of these logical addresses is set to T (true). Other logical addresses such as "j," "j+1" and "j+2" are not assigned physical addresses, and the enable flag corresponding to each of these logical addresses is set to F (false).

FIG. 20 is a tabular view showing a typical sector address translation table 330 in effect after writing of data to the flash memory 500 as part of the embodiment. The shaded portions in FIG. 20 are the fields updated in the sector address translation table 330 shown in FIG. 19. Consider an example where the first logical address is "j" and where a flash memory page (8 sectors) is written to the flash memory 500. In this case, to each of the fields of the flash memory physical addresses corresponding to the logical addresses "j" through "j+7," a physical address "$fA_j$," corresponding to the logical address "j" is written. Also, to the fields of the physical address offsets corresponding to the logical addresses "j" through "j+7," values "0" through "7" are written which denote the relative positions of the physical addresses relative to the physical address "$fA_j$." Furthermore, the enable flag corresponding to each of the logical addresses "j" through "j+7" is set to T (true). In this manner, each of the logical addresses is assigned the reference physical address in the flash memory page together with the corresponding physical address offset.

FIG. 21 is a tabular view showing a typical sector address translation table 330 in effect before writing of data to the NVRAM 400 as part of the embodiment. Logical addresses such as "i," "i+1" and "i+2" are not assigned any physical addresses, and the enable flag and NVRAM flag corresponding to each of these logical addresses are set to F (false).

FIG. 22 is a tabular view showing a typical sector address translation table 330 in effect after writing of data to the NVRAM 400 as part of the embodiment. The shaped portions in FIG. 22 are the fields updated in the sector address translation table 330 shown in FIG. 21. Consider an example where the first logical address is "i" and where three sectors of data are written to the NVRAM 400. In this case, the NVRAM flag corresponding to each of the logical addresses "i" through "i+2" is set to T (true). Also, to the fields of the NVRAM sector numbers corresponding to the logical addresses "i" through "i+2," values 0 through are written which represent the relative positions of the logical addresses relative to the first logical address. To each of the fields of the NVRAM continuous sector counts corresponding to the logical addresses "i" through "i+2," the value "3" is written. In this manner, when data is written to the NVRAM 400, the logical addresses involved are associated with the corresponding logical address counts (i.e., NVRAM continuous sector counts) and with the relative positions (NVRAM sector numbers) of these logical addresses.

According to the above-described embodiment of the disclosed technology, when writing a plurality of data, the storage control unit 300 writes to the NVRAM 400 as many number of data as can be read from the NVRAM 400 within a time period corresponding to the access time of the flash memory 500, and writes the remaining data to the flash memory 500. When reading a plurality of data, the storage control unit 300 issues read requests to the NVRAM 400 and flash memory 500 in such a manner that data readout from the flash memory 500 is started upon completion of the readout from the NVRAM 400. This arrangement allows the storage control unit 300 to start reading data from the flash memory 500 following completion of the data readout from the NVRAM 400. That means there is no idle time between the time the reading of data from the NVRAM 400 is completed and the time the reading of data from the flash memory 500 is started, whereby throughput is enhanced. Also, because a minimum number of data for improving throughput are written to the NVRAM 400, the capacity of the NVRAM 400 can be utilized efficiently.

Furthermore, because the storage control unit 300 can write data in such a manner that the data may be read at high speed, the convenience of the equipment that reads such data can be improved. For example, this feature may be particularly effective in enhancing the convenience of smartphones, tablet PC's (personal computers), and other equipment often requiring high-speed boot. Specifically, the software code to be executed upon booting of such equipment may be written in such a manner that the code may be read at high speed. This provides high-speed booting of the equipment.

<2. Variation>

A variation of the above-described embodiment is explained below by reference to FIG. 23. FIG. 23 schematically shows typical parameters to be set in a write command for use with a variation of the embodiment. As one of the parameters, the NVRAM continuous sector count is set to replace the high-speed designation flag HF. When writing data composed of a plurality of sectors, the host computer 100 determines the NVRAM continuous sector count and instructs the data storage device 2000 thereof. The host computer 100 may change the NVRAM continuous sector count based on the type of the application in use and on the time for data transfer between the host computer 100 and the data storage device 200. On the instructions of the host computer 100, the data storage device 200 sets the NVRAM continuous sector count.

According to the variation outlined above, the host computer 100 can change the NVRAM continuous sector count as needed.

The embodiment and its variation described above are merely examples in which the present disclosure may be implemented. The particulars of the embodiment and its variation in the description of the preferred embodiments of this specification correspond basically to the disclosed matters claimed in the appended claims. Likewise, the disclosed matters named in the appended claims correspond basically to the particulars with the same names in the description of the preferred embodiments. However, such embodiments, variations, and other examples of the present disclosure are not limitative thereof, and it should be understood by those skilled in the art that various modifications, combinations, sub-combinations and alterations may occur depending on design requirements and other factor in so far as they are within the scope of the appended claims or the equivalents thereof.

The series of the steps and processes discussed above as part of the embodiments may also be construed as a method for carrying out such steps and processes, as a program for causing a computer to execute such a method, or as a recording medium that stores such a program. The recording medium may be any one of CDs (Compact Discs), MDs (MiniDiscs), DVDs (Digital Versatile Disks), memory cards, or Blu-ray Discs (registered trademark), for example.

The disclosed technology may also be configured as follows:

(1) A storage control device including: a write block configured such that given a low-speed access storage block having an access time longer than that of a high-speed access storage block, the access time being from the time a request to read data is issued to the time the data is read, the write block establishes as a high-speed access data count the number of data readable by the high-speed access storage block within a time period corresponding to the access time of the low-speed access storage block, the write block further writing, if a plurality of data are to be written to the high-speed and the low-speed access storage blocks, as many data as the high-speed access data count from among the plurality of data to the high-speed access storage block as high-speed access data while writing the remaining data to the low-speed access storage block as low-speed access data, and a read block configured such that if the plurality of data written to the low-speed and the high-speed access storage blocks are to be read therefrom, the read block issues a request to the high-speed access storage block to read the high-speed access data and a request to the low-speed access storage block to start reading the low-speed access data after the high-speed access data have been read out.

(2) A storage control device as described in paragraph (1) above, further including a management information storage block configured to store management information for acquiring a low-speed access start address at which the low-speed access data to be read first have been written, from a high-speed access address at which the high-speed access data have been written; wherein, if the high-speed access data are to be read from the high-speed access address, the read block issues a request to the high-speed access storage block to read the high-speed access data, the read block further acquiring the low-speed access start address based on the management information, the read block further issuing a request to the low-speed access storage block to read the low-speed access data from the low-speed access start address.

(3) A storage control device as described in paragraph (2) above, wherein the management information storage block stores as the management information a relative positional relationship between each of the high-speed access addresses and the low-speed access start address, and wherein, upon reading the high-speed access data from any one of the high-speed access addresses, the read block acquires the low-speed access start address from the high-speed access address in question and from the management information corresponding to the high-speed access address.

(4) A storage control device as described in any one of paragraphs (1) through (3) above, wherein the read block issues simultaneously the request to the high-speed access storage block to read the high-speed access data and the request to the low-speed access storage block to read the low-speed access data.

(5) A storage control device as described in any one of paragraphs (1) through (4) above, wherein, if the high-speed access data count is designated with an instruction to write the plurality of data, the write block writes the plurality of data upon establishing the designated high-speed access data count.

(6) A storage control device as described in paragraph (5) above, wherein, if it is instructed with the instruction to write that the written data are to be later read at high speed, the write block writes to the high-speed access storage block as many data as the high-speed access data count as the high-speed access data while writing the remaining data to the low-speed access storage block as the low-speed access data.

(7) A control method for controlling a storage control device having a write block and a read block, the control method including: given a low-speed access storage block having an access time longer than that of a high-speed access storage block, the access time being from the time a request to read data is issued to the time the data is read, causing the write block to establish as a high-speed access data count the number of data readable by the high-speed access storage block within a time period corresponding to the access time of the low-speed access storage block; causing the write block further to write, if a plurality of data are to be written to the high-speed and the low-speed access storage blocks, as many data as the high-speed access data count from among the plurality of data to the high-speed access storage block as high-speed access data while writing the remaining data to the low-speed access storage block as low-speed access data, and if the plurality of data written to the low-speed and the high-speed access storage blocks are to be read therefrom, causing the read block to issue a request to the high-speed access storage block to read the high-speed access data and a request to the low-speed access storage block to start reading the low-speed access data after the high-speed access data have been read out.

(8) A storage device including: a high-speed access storage block; a low-speed access storage block configured to have an access time longer than that of the high-speed access storage block, the access time being from the time a request to read data is issued to the time the data is read out, and a storage control device including: a write block configured to establish as a high-speed access data count the number of data readable by the high-speed access storage block within a time period corresponding to the access time of the low-speed access storage block, the write block further writing, if a plurality of data are to be written to the high-speed and the low-speed access storage blocks, as many data as the high-speed access data count from among the plurality of data to the high-speed access storage block as high-speed access data while writing the remaining data to the low-speed access storage block as low-speed access data, and a read block configured such that if the plurality of data written to the low-speed and the high-speed access storage blocks are to be read therefrom, the read block issues a request to the high-speed access storage block to read the high-speed access data and a request to the low-speed access storage block to start reading the low-speed access data after the high-speed access data have been read out.

The present disclosure contains subject matter related to that disclosed in Japanese Priority Patent Application JP 2012-001781 filed in the Japan Patent Office on Jan. 10, 2012, the entire content of which is hereby incorporated by reference.

It should be understood by those skilled in the art that various modifications, combinations, sub-combinations and alterations may occur depending on design requirements and other factors in so far as they are within the scope of the appended claims or the equivalents thereof.

What is claimed is:

1. A storage control device comprising:
 a write block configured such that given a low-speed access storage block having an access time longer than that of a high-speed access storage block, said access time being from a time when a request to read data is issued to a time when said data is read, said write block establishes as a high-speed access data count a quantity of data readable by said high-speed access storage block within a time period corresponding to the access time of said low-speed access storage block, said write block writing, if a plurality of data are to be written to said high-speed access storage block and said low-speed access storage block, said high-speed access data count of said plurality of data to said high-speed access storage block as high-speed access data while writing remaining data of said plurality of data to said low-speed access storage block as low-speed access data, and
 a read block configured such that if said plurality of data written to said low-speed access storage block and said high-speed access storage blocks are to be read therefrom, said read block issues a high-speed read request to said high-speed access storage block to read said high-speed access data and a low-speed read request to said low-speed access storage block to start reading said low-speed access data after said high-speed access data have been read out.

2. The storage control device according to claim 1, wherein said read block issues simultaneously the high-speed read request to said high-speed access storage block to read said high-speed access data and the low-speed read request to said low-speed access storage block to read said low-speed access data.

3. The storage control device according to claim 1, further comprising a management information storage block configured to store management information for acquiring a low-speed access start address at which said low-speed access data have been written, from a high-speed access address at which said high-speed access data have been written; wherein, if said high-speed access data are to be read from said high-speed access address, said read block issues a request to said high-speed access storage block to read said high-speed access data, said read block acquiring said low-speed access start address based on said management information, said read block further issuing a low-speed read request to said low-speed access storage block to read said low-speed access data from said low-speed access start address.

4. The storage control device according to claim 3, wherein said management information storage block stores as said management information a relative positional relationship between each of the high-speed access address and said low-speed access start address; wherein, upon reading said high-speed access data from said high-speed access address, said read block acquires said low-speed access start address from said high-speed access address and from said management information corresponding to said high-speed access address.

5. The storage control device according to claim 1, wherein, if said high-speed access data count is designated with an instruction to write said quantity of data, said write block writes said quantity of data upon establishing the designated high-speed access data count.

6. The storage control device according to claim 5, wherein, it is instructed, with said instruction to write, that written data are to be later read at high speed, said write block writes as many data as said high-speed access data count to said high-speed access storage block as said high-speed access data while writing the remaining data to said low-speed access storage block as said low-speed access data.

7. A control method for controlling a storage control device having a write block and a read block, said control method comprising:

given a low-speed access storage block having an access time longer than that of a high-speed access storage block, said access time being from a time when a request to read data is issued to a time when said data is read, causing said write block to establish as a high-speed access data count a quantity of data readable by said high-speed access storage block within a time period corresponding to the access time of said low-speed access storage block;

causing said write block to write, if a plurality of data are to be written to said high-speed access storage block and said low-speed access storage blocks, as many data as said high-speed access data count of said plurality of data to said high-speed access storage block as high-speed access data while writing remaining data of said plurality of data to said low-speed access storage block as low-speed access data, and if said plurality of data written to said low-speed access storage block and said high-speed access storage blocks are to be read therefrom, causing said read block to issue a high-speed read request to said high-speed access storage block to read said high-speed access data and a low-speed read request to said low-speed access storage block to start reading said low-speed access data after said high-speed access data have been read out.

8. A storage device comprising:

a high-speed access storage block;

a low-speed access storage block configured to have an access time longer than that of said high-speed access storage block, said access time being from a time when a request to read data is issued to a time when said data is read out; and a storage control device including a write block configured to establish as a high-speed access data count a quantity of data readable by said high-speed access storage block within a time period corresponding to the access time of said low-speed access storage block, said write block writing, if a plurality of data are to be written to said high-speed access storage block and said low-speed access storage blocks, as many data as said high-speed access data count of said plurality of data to said high-speed access storage block as high-speed access data while writing remaining data to said low-speed access storage block as low-speed access data, and a read block configured such that if said plurality of data written to said low-speed access storage block and said high-speed access storage block are to be read therefrom, said read block issues a high-speed read request to said high-speed access storage block to read said high-speed access data and a low-speed read request to said low-speed access storage block to start reading said low-speed access data after said high-speed access data have been read out.

* * * * *